(12) United States Patent
Oyamada et al.

(10) Patent No.: US 7,738,211 B2
(45) Date of Patent: Jun. 15, 2010

(54) MAGNETIC DISK APPARATUS AND MAGNETIC DISK APPARATUS CONTROL METHOD

(75) Inventors: Kazuhiro Oyamada, Kawasaki (JP); Koji Ishii, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/261,710

(22) Filed: Oct. 30, 2008

(65) Prior Publication Data

US 2009/0141390 A1 Jun. 4, 2009

(30) Foreign Application Priority Data

Oct. 31, 2007 (JP) ............................. 2007-283220

(51) Int. Cl.
*G11B 21/02* (2006.01)
*G11B 27/36* (2006.01)

(52) U.S. Cl. .......................................... 360/75; 360/31

(58) Field of Classification Search ................ None
See application file for complete search history.

(56) References Cited

U.S. PATENT DOCUMENTS

| 6,144,178 A * | 11/2000 | Hirano et al. ............... 318/476 |
| 2005/0213250 A1 | 9/2005 | Kurita et al. |
| 2007/0268615 A1* | 11/2007 | McFadyen et al. ............ 360/75 |
| 2008/0186621 A1* | 8/2008 | Partee ..................... 360/97.02 |

FOREIGN PATENT DOCUMENTS

| JP | 5-20635 | 1/1993 |
| JP | 2005-276284 | 10/2005 |

* cited by examiner

*Primary Examiner*—Andrew L Sniezek
(74) *Attorney, Agent, or Firm*—Staas & Halsey LLP

(57) ABSTRACT

A magnetic disk apparatus has a heater for heating a head incorporated in the magnetic disk apparatus, an atmospheric pressure detector for detecting a change in atmospheric pressure in the magnetic disk apparatus, and an adjuster for adjusting a thermal dose supplied to the head by the heater according to the change in atmospheric pressure detected by the atmospheric pressure detector.

22 Claims, 24 Drawing Sheets

FIG. 3

| PRESSURE REDUCTION LEVEL | TRACKING ACCURACY DIFFERENTIAL ontdiff | HEATER POWER CUTBACK hp_back |
|---|---|---|
| 0 | VII ontdiff 0 | No change |
| 1 | VII ontdiff 1 | 1 |
| 2 | VII ontdiff 2 | 2 |
| 3 | VII ontdiff 3 | 3 |
| 4 | VII ontdiff 4 | 4 |
| 5 | VII ontdiff 5 | 5 |
| 6 | VII ontdiff 6 | 6 |
| 7 | VII ontdiff 7 | 7 |
| 8 | VII ontdiff 8 | 8 |
| 9 | VII ontdiff 9 | Unload or CSS |

Unit : [bit]

FIG. 4
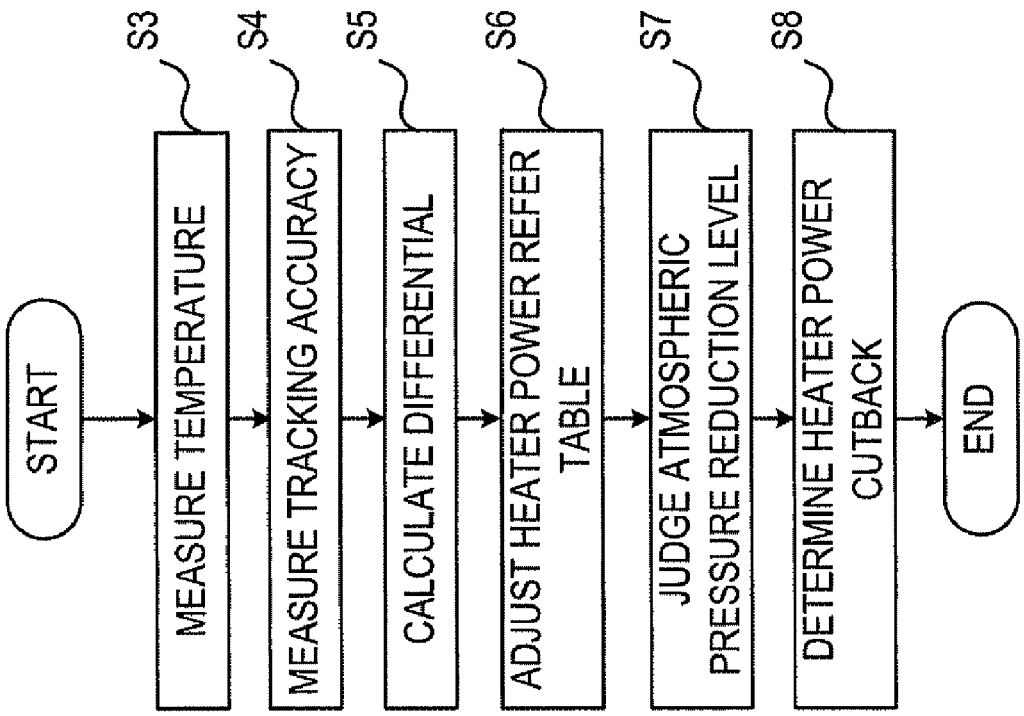
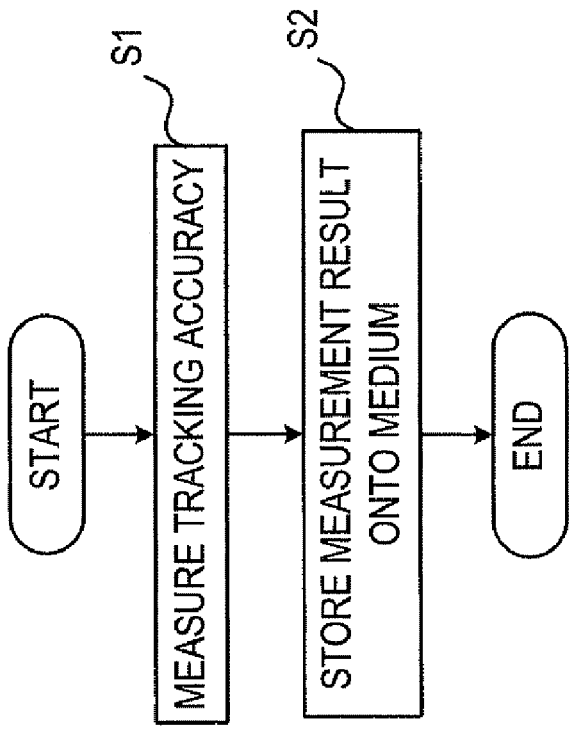

FIG. 6
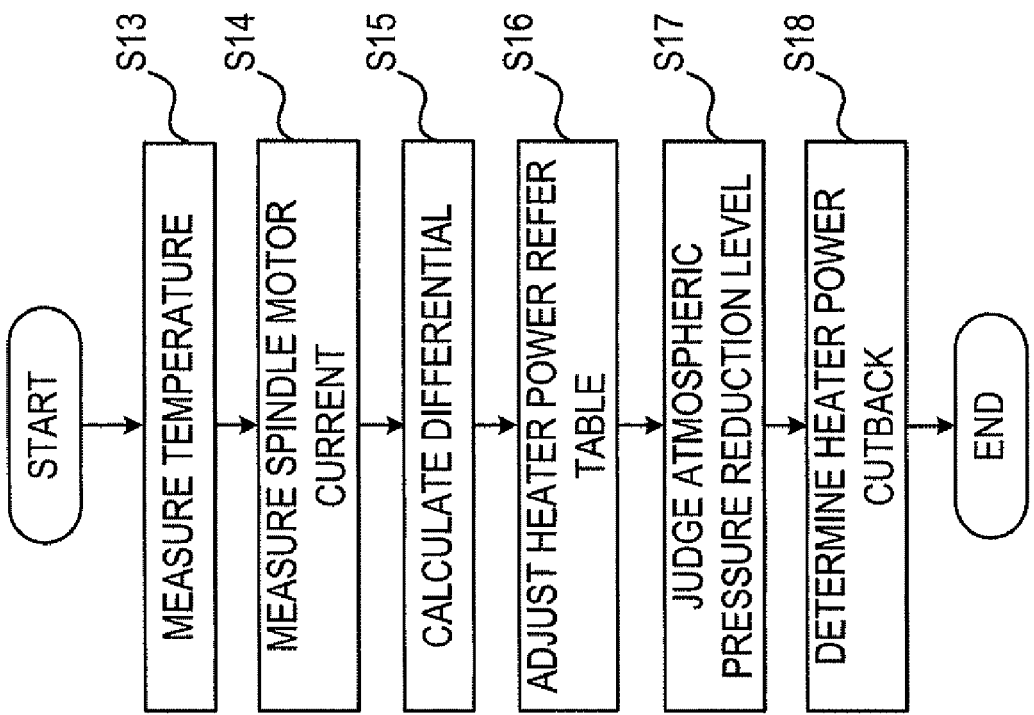
[AFTER SHIPPING]
START → MEASURE TEMPERATURE (S13) → MEASURE SPINDLE MOTOR CURRENT (S14) → CALCULATE DIFFERENTIAL (S15) → ADJUST HEATER POWER REFER TABLE (S16) → JUDGE ATMOSPHERIC PRESSURE REDUCTION LEVEL (S17) → DETERMINE HEATER POWER CUTBACK (S18) → END
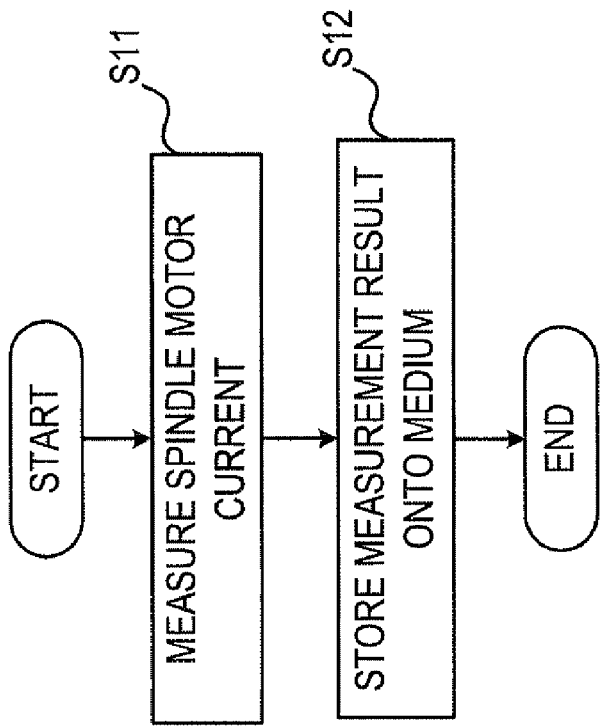
[INSPECTION BEFORE SHIPPING]
START → MEASURE SPINDLE MOTOR CURRENT (S11) → STORE MEASUREMENT RESULT ONTO MEDIUM (S12) → END

FIG. 7

| PRESSURE REDUCTION LEVEL | SPM CURRENT DIFFERENTIAL spmdiff | HEATER POWER CUTBACK hp_back |
|---|---|---|
| 0 | spmdiff 0 ≦ | No change |
| 1 | spmdiff 1 ≦ | 1 |
| 2 | spmdiff 2 ≦ | 2 |
| 3 | spmdiff 3 ≦ | 3 |
| 4 | spmdiff 4 ≦ | 4 |
| 5 | spmdiff 5 ≦ | 5 |
| 6 | spmdiff 6 ≦ | 6 |
| 7 | spmdiff 7 ≦ | 7 |
| 8 | spmdiff 8 ≦ | 8 |
| 9 | spmdiff 9 ≦ | Unload or CSS |

Unit : [bit]

FIG. 11
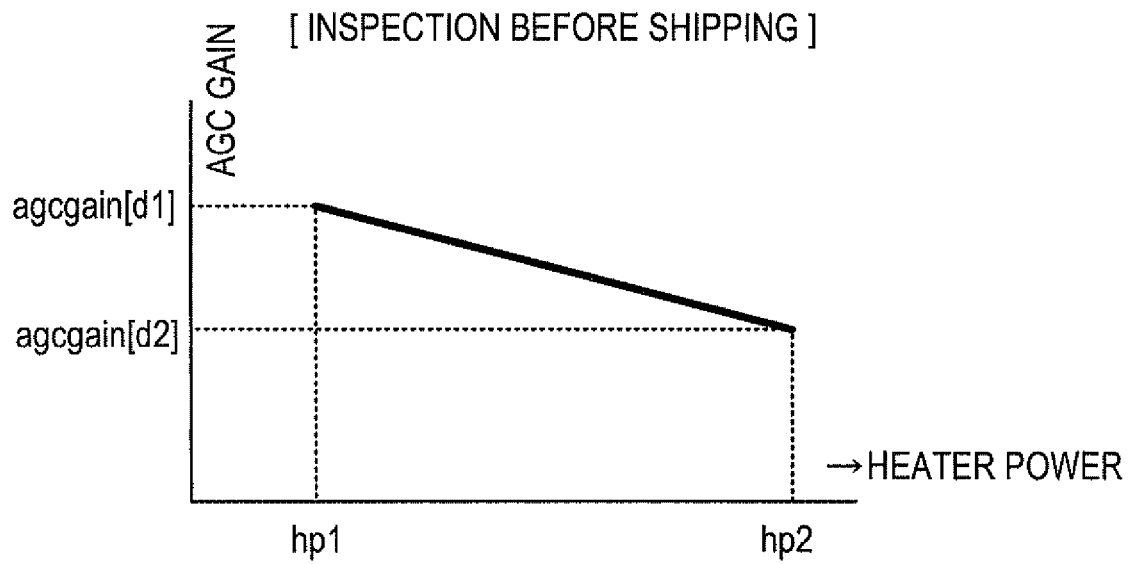
hp_sens[d] = (agcgain[d1]-agcgain[d2])/(hp1-hp2)
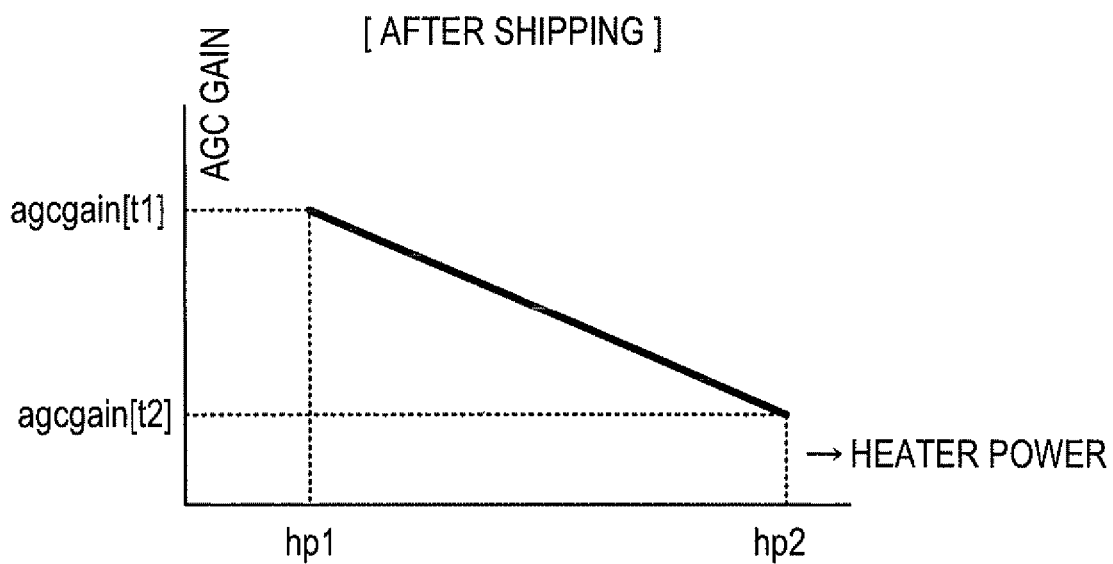
hp_sens[t] = (agcgain[t1]-agcgain[t2])/(hp1-hp2)
hp_diff = hp_sens[d]-hp_sens[t]

FIG. 12

| PRESSURE REDUCTION LEVEL | HEATER SENSITIVITY DIFFERENTIAL hp_diff | HEATER POWER CUTBACK hp_back |
|---|---|---|
| 0 | agcdiff 0 ≦ | No change |
| 1 | agcdiff 1 ≦ | 1 |
| 2 | agcdiff 2 ≦ | 2 |
| 3 | agcdiff 3 ≦ | 3 |
| 4 | agcdiff 4 ≦ | 4 |
| 5 | agcdiff 5 ≦ | 5 |
| 6 | agcdiff 6 ≦ | 6 |
| 7 | agcdiff 7 ≦ | 7 |
| 8 | agcdiff 8 ≦ | 8 |
| 9 | agcdiff 9 ≦ | Unload or CSS |

Unit : [bit]

FIG. 18
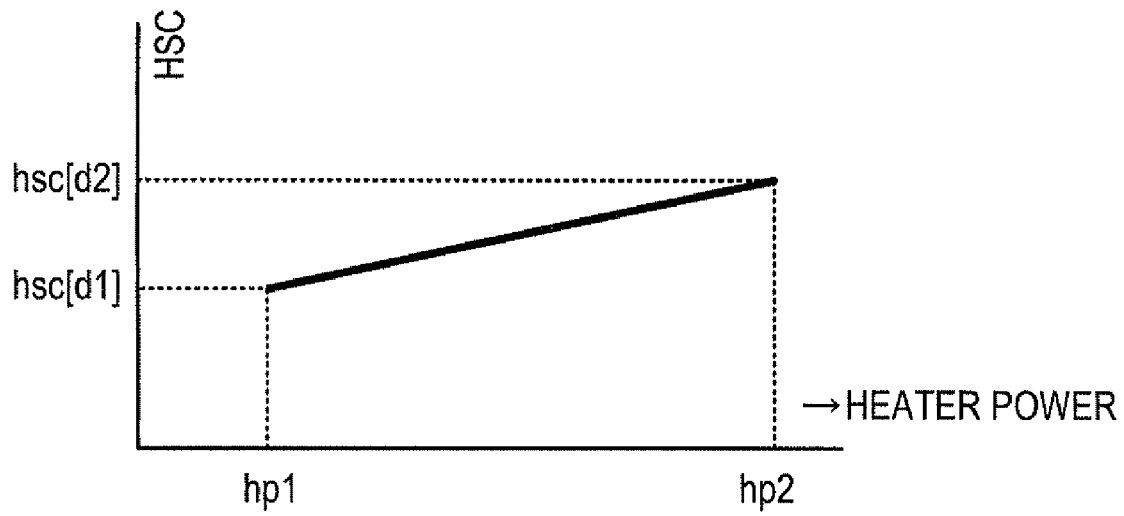
[ INSPECTION BEFORE SHIPPING ]
hp_sens[d] = (hsc[d1]-hsc[d2])/(hp1-hp2)
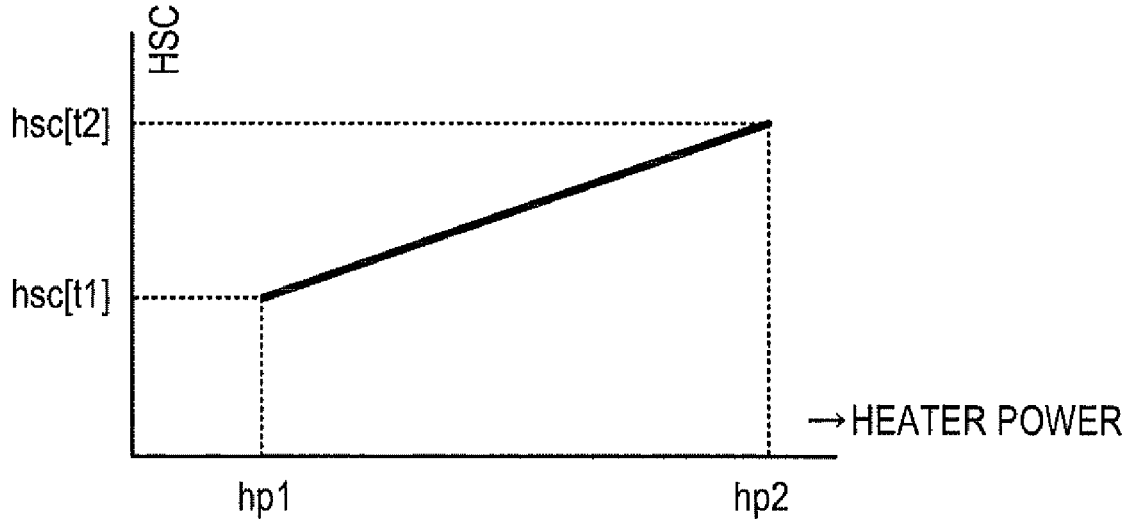
[ AFTER SHIPPING ]
hp_sens[t] = (hsc[t1]-hsc[t2])/(hp1-hp2)
hp_diff = hp_sens[d]-hp_sens[t]

FIG. 19

| PRESSURE REDUCTION LEVEL | HEATER SENSITIVITY DIFFERENTIAL hp_diff | HEATER POWER CUTBACK hp_back |
|---|---|---|
| 0 | ≦ hscdiff 0 | No change |
| 1 | ≦ hscdiff 1 | 1 |
| 2 | ≦ hscdiff 2 | 2 |
| 3 | ≦ hscdiff 3 | 3 |
| 4 | ≦ hscdiff 4 | 4 |
| 5 | ≦ hscdiff 5 | 5 |
| 6 | ≦ hscdiff 6 | 6 |
| 7 | ≦ hscdiff 7 | 7 |
| 8 | ≦ hscdiff 8 | 8 |
| 9 | ≦ hscdiff 9 | Unload or CSS |

Unit : [bit]

FIG. 20
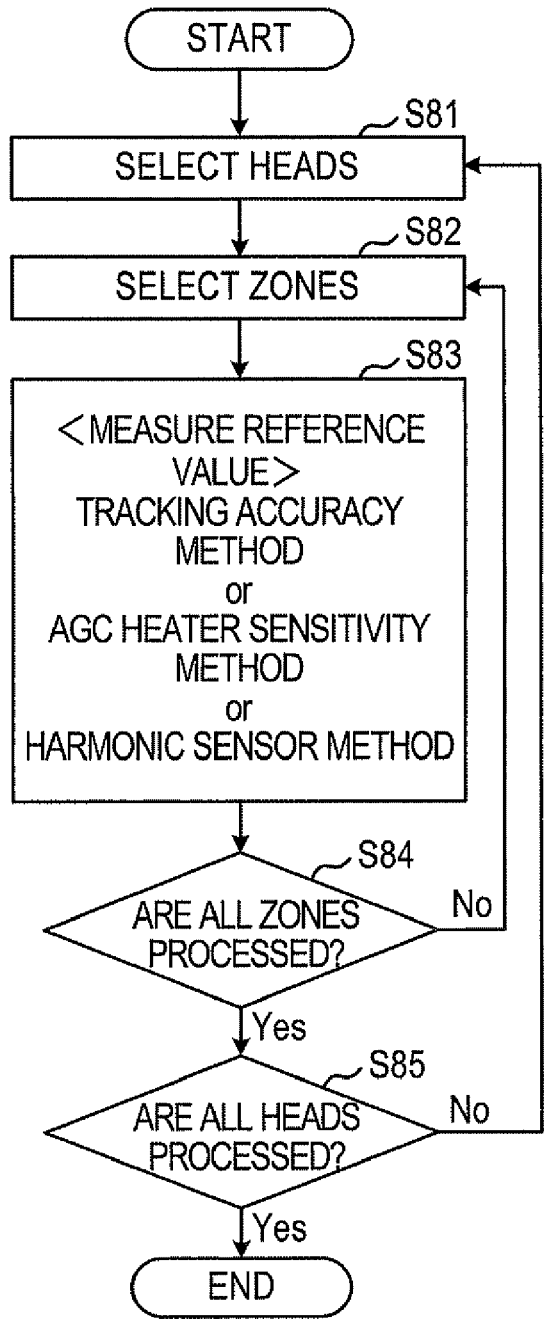
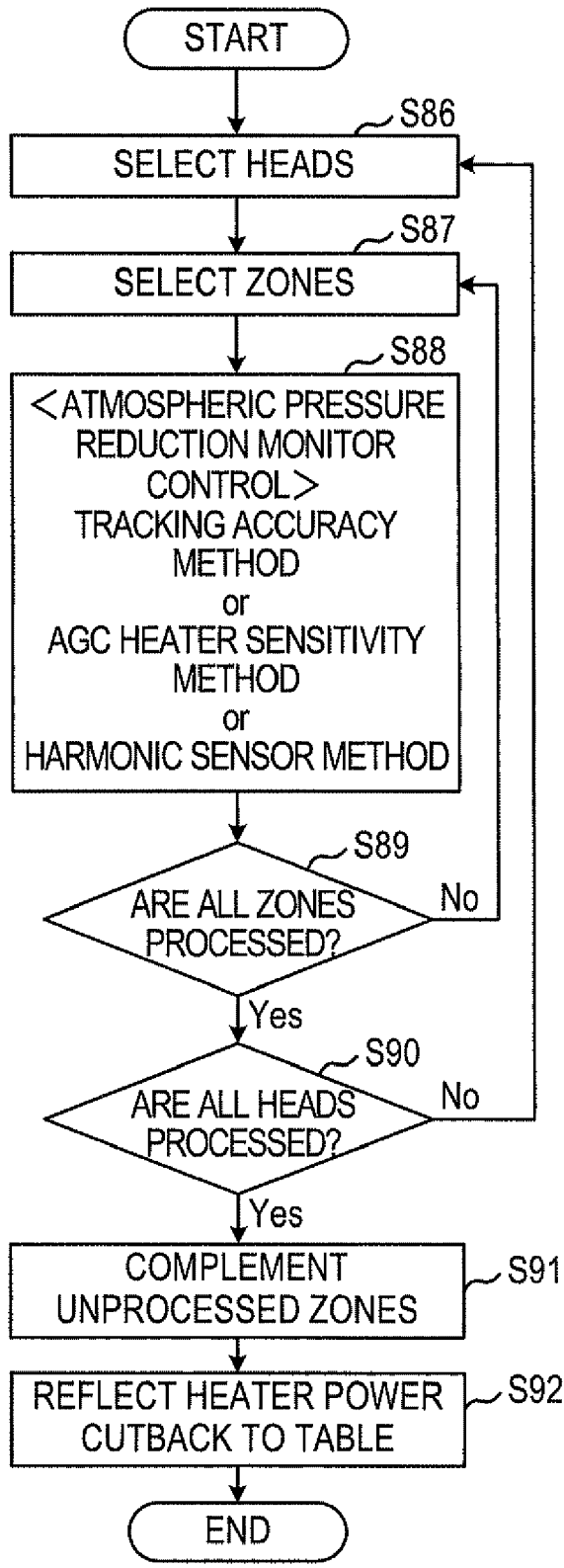

FIG. 24
[ UNDER NORMAL ATMOSPHERIC PRESSURE ]
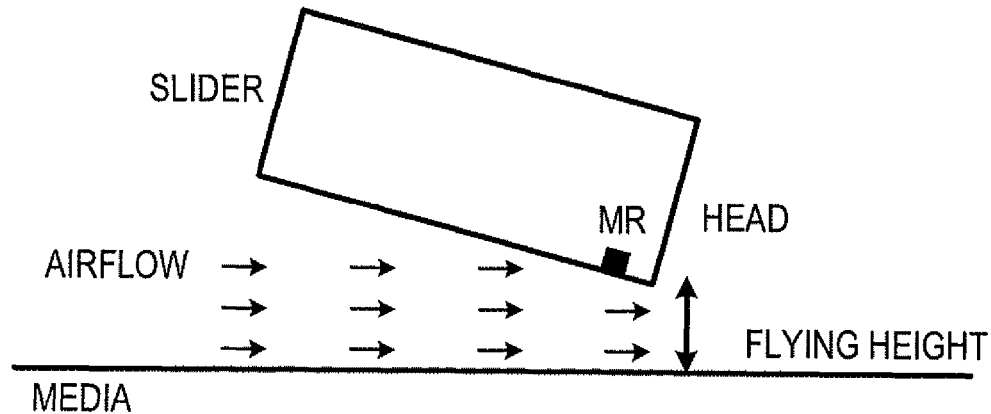
[ HEATING ]
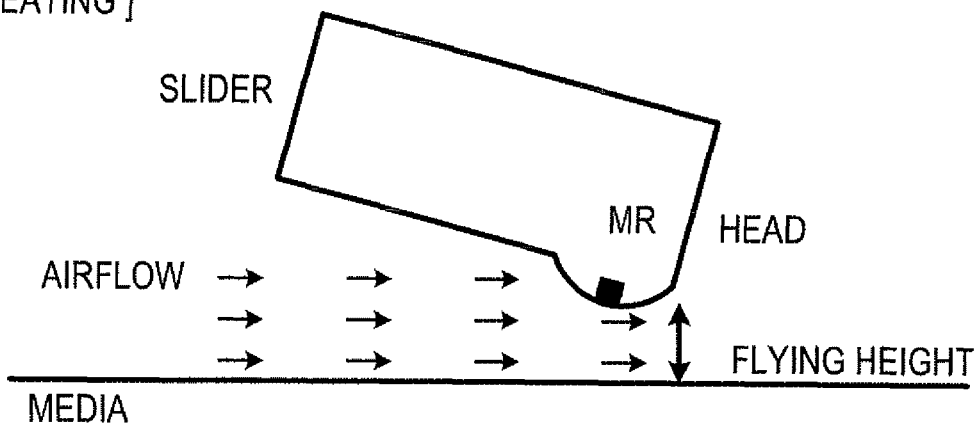
[ UNDER REDUCED ATMOSPHERIC PRESSURE ]
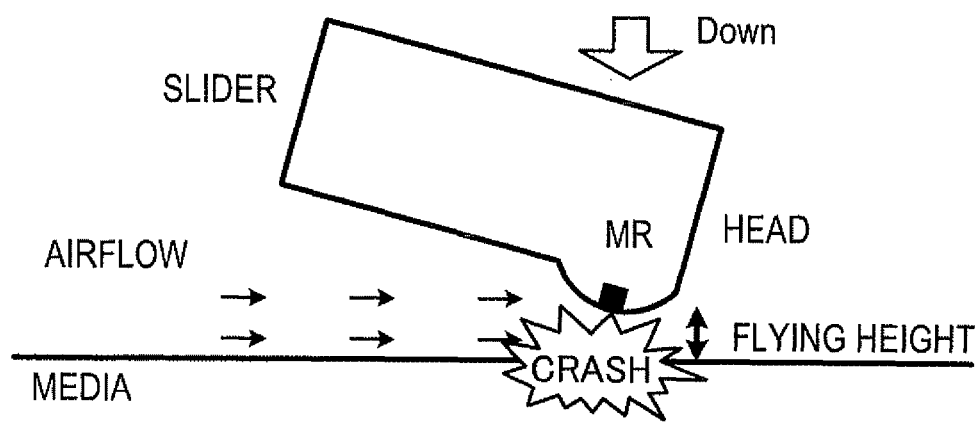

MAGNETIC DISK APPARATUS AND MAGNETIC DISK APPARATUS CONTROL METHOD

CROSS-REFERENCE TO RELATED APPLICATIONS

This application is based upon and claims the benefit of priority of the prior Japanese Patent Application No. 2007-283220, filed on Oct. 31, 2007, the entire contents of which are incorporated by reference herein.

BACKGROUND

The present application describes a magnetic disk apparatus and a magnetic disk apparatus control method for storing information onto a recording medium with magnetic head.

The magnetic disk apparatus writes information onto the magnetic medium with the magnetic head. The magnetic head is lifted over the medium by airflow generated by spinning of the medium.

Generally, outputs from the magnetic head increase and the magnetic properties of the magnetic head improve. Recently, the clearance between the magnetic head and the medium has been decreasing on the order of several nanometers to increase recording density.

Current magnetic disk apparatuses have a dynamic flying height (DFH) control system. The DFH control system controls the clearance between the magnetic head and the magnetic medium. The DFH control system controls the clearance by expanding the magnetic head element with a current supplied to a heating circuit embedded in the magnetic head. Refer FIG. 24, [Under normal atmospheric pressure] and [Supplied heating]

While the magnetic properties improve as the clearance between the head and the medium decreases, the occurrence of head crashes may rise due to infinitesimal projections on the medium. In particular, when an atmospheric pressure decreases, a lift generated by the airflow decreases and therefore the occurrence of head crashes with the magnetic medium may increase. When the head crashes occur, data write and read may interfere with each other, or take more time. In a worst-case scenario, the magnetic head or the magnetic medium may be damaged. Refer to FIG. 24, [Under reduced atmospheric pressure].

Thus, such failures may be prevented by sensing a decrease of the atmospheric pressure.

Generally, outputs from the magnetic head increase and automatic gain control (AGC) gain decreases when the flying height of the magnetic head decreases. Owing to this characteristic, changes of the flying height are detected by monitoring the AGC gain.

However, the clearance between the magnetic head element and the magnetic medium does not always decrease, depending on a design of a magnetic head slider or a suspension when the atmospheric pressure decreases. Furthermore, the AGC gain changes depending on a temperature so that the sensing the change of the atmospheric pressure accurately is difficult. In short, the outputs of the magnetic head do not always increase when the atmospheric pressure decreases. Thus, the change in atmospheric pressure may not be detected accurately with AGC gain alone.

SUMMARY

The present application is proposed to address the issues described above. An object of the present application is to provide the magnetic disk apparatus and the magnetic disk apparatus control method for sensing the changes in the atmospheric pressure and adjusting a current supplied to the heater circuits embedded in the magnetic head.

According to the present application, a magnetic disk apparatus has a heater for heating a head incorporated in the magnetic disk apparatus, an atmospheric pressure detector for detecting a change in atmospheric pressure in the magnetic disk apparatus, and an adjuster for adjusting a thermal dose supplied to the head by the heater according to the change in atmospheric pressure detected by the atmospheric pressure detector.

The above-described embodiments of the present application are intended as examples, and all embodiments of the present application are not limited to including the features described above.

BRIEF DESCRIPTION OF THE DRAWINGS

FIG. 3 is an example of a heater power adjustment table for the tracking accuracy method;

FIG. 4 is a flow chart illustrating a process of the tracking accuracy;

FIG. 6 is a flow chart illustrating a process of a spindle motor method;

FIG. 7 is an example of a heater power adjustment table for the spindle motor method;

FIG. 11 is graphs illustrating a calculation method of the AGC gain;

FIG. 12 is an example of a heater power adjustment table for the AGC heater sensitivity method;

FIG. 18 is a graph illustrating a calculation method of the heater sensitivity of the harmonic sensor;

FIG. 19 is s heater power adjustment table for the harmonic sensor method;

FIG. 20 shows flow charts illustrating processes of multiple magnetic heads and zones with the tracking accuracy method, the AGC heater sensitivity method and the harmonic sensor method;

FIG. 24 illustrates a relationship between the magnetic head, the medium and the atmospheric pressure.

DETAILED DESCRIPTION OF THE PREFERRED EMBODIMENTS

Figure 1:
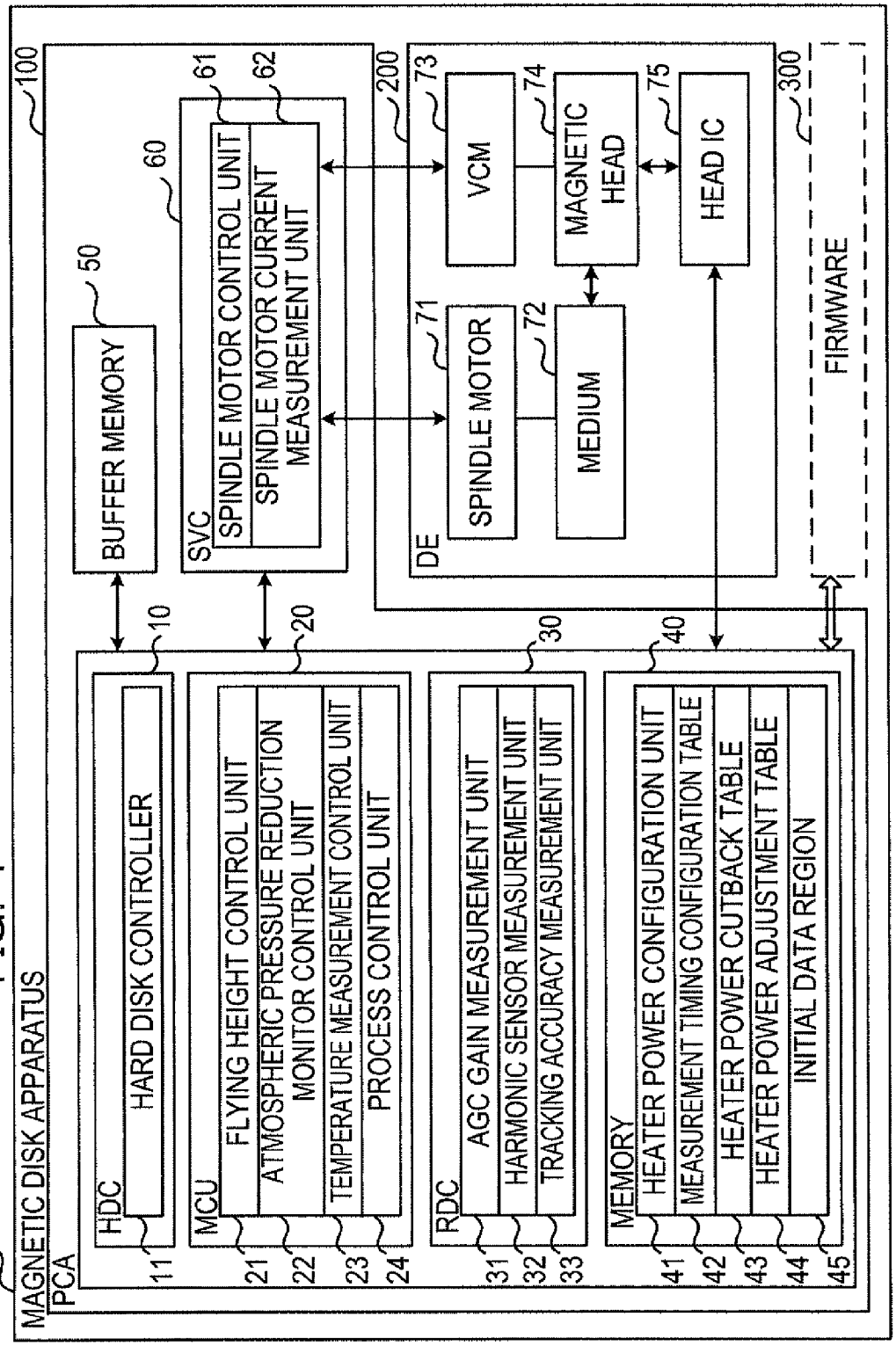
FIG. 1 illustrates an example of a structure of the magnetic disk apparatus.

Reference may now be made in detail to embodiments, examples of which are illustrated in the accompanying drawings, wherein like reference numerals refer to like elements throughout.

The magnetic disk apparatus according to this embodiment detects a change in atmospheric pressure in the magnetic disk apparatus and adjusts a heater power. In other words, a thermal dose is supplied to the heating circuit embedded in the magnetic head according to the change to control the flying height of the magnetic head.

First, the structure of the magnetic disk apparatus according to the embodiment will be described with reference to FIG. 1.

A magnetic disk apparatus 1 has a printed circuit board assembly (PCA) for controlling communication with a host connected with the magnetic disk apparatus 1, a PCA 100; a disk enclosure (DE) 200 in which a disk drive is housed; and firmware 300.

The PCA 100 has a hard disk controller (HDC) 10 for controlling interface protocols, data buffering and disk formatting; a memory 40; a micro control unit (MCU) 20 for executing commands issued from the firmware 300; and a read channel (RDC) 30 for controlling data modulation in writing and data demodulation in reading. The memory 40 is for reading various information from a system area (SA) of a magnetic medium and storing the information for a long time.

The PCA 100 also has a buffer memory 50 for storing data temporarily until the data are transferred to the host in the lump for various data processing; and a servo control IC (SVC) 60 for controlling a voice coil motor (VCM) 73 and spindle motor 71 described later.

The DE 200 has a VCM 73 for controlling an actuator supporting a magnetic head 74; a disc-shaped magnetic recording medium, a medium 72 on which data are written and stored; the spindle motor 71 for controlling rotations of a spindle; and a magnetic head 74, a combination type magnetoresistive (MR) head, for data writing and reading. The magnetic head 74 has a heating circuit for expanding a magnetic head element by applying a current.

The components of the magnetic disk apparatus 1 described above are implemented with the firmware 300. Here, functions of the magnetic disk apparatus 1 and data to be used will be described. The functions are illustrated by function block in FIG. 1.

A hard disk controller 11 controls the magnetic disk apparatus 1 according to read and write commands issued by the host connected with the magnetic disk apparatus 1. A flying height control unit 21 controls the current supplied to the heating circuit embedded in the magnetic head (hereinafter referred to as a heater power or a thermal dose) in accordance with an atmospheric pressure reduction level measured by an atmospheric pressure reduction monitor control unit 22 for controlling the flying height of the magnetic head 74. The atmospheric pressure reduction monitor control unit 22 judges the atmospheric pressure reduction level in the magnetic disk apparatus 1 according to measured values obtained from an AGC gain measurement unit 31, harmonic sensor measurement unit 32, a tracking accuracy measurement unit 33, and a spindle motor current measurement unit 62. A temperature measurement control unit 23 determines a temperature range into which the temperature in the magnetic disk apparatus 1 falls from among three temperature ranges, high temperatures, normal temperatures and low temperatures. A process control unit 24 controls process execution timing, head processing and zone processing.

The AGC gain measurement unit 31 measures the AGC gain of the output from the magnetic head 74. The harmonic sensor measurement unit 32 measures a specific frequency element output from the magnetic head 74. The tracking accuracy measurement unit 33 measures a positioning accuracy of the magnetic head 74.

A heater power configuration table 41 stores values of the heater power supplied to the magnetic head 74. The flying height control unit 21 supplies a heater power, or the thermal dose, to the magnetic head 74 according to the value configured in the heater power configuration table 41.

A measurement timing configuration table 42 stores measurement execution timings as flags, i.e., on starting up, in the event of an error, or at a specific intervals. The measurement timing configuration table also stores settings of execution time intervals.

A heater power cutback table 43 stores heater power determined by the flying height control unit 21. The heater power cutback table 43 stores heater power cutbacks determined by the flying height control unit 21.

A heater power adjustment table 44 stores associations between the atmospheric pressure reduction levels, the heater power cutbacks and differentials between each reference value and each measured value. Differentials between a tracking accuracy measured before shipping and a tracking accuracy currently measured are stored for the tracking accuracy method. An initial data region 45 stores reference values measured before shipping.

Temperatures at which the magnetic disk apparatus 1 is operable are categorized into three ranges as high temperatures, normal temperatures and low temperatures. The tables described above and the reference values are stored in the memory 40 according to the temperature ranges. For example, temperatures below 5 degree Centigrade temperature fall into the low temperatures, temperatures over 35 degree Centigrade temperature fall into the high temperatures and temperatures between the high and low temperatures fall into the normal temperatures in an embodiment of the present application. In this embodiment, the temperatures are categorized into three ranges. However, the numbers of the temperature ranges may not be limited.

A spindle motor control unit 61 controls the spindle motor 71. The spindle motor current measurement unit 62 measures a current to rotate the spindle motor 71.

In this embodiment, the change in atmospheric pressure in the magnetic disk apparatus 1 is detected. The atmospheric pressure reduction level is judged by using any of four methods—the tracking accuracy method, the spindle motor method, the AGC heater sensitivity method and the harmonic sensor method. Then a heater power cutback is determined, or else a correction value to the heater power supplied to the magnetic head 74 under the normal atmospheric pressure is determined, according to the atmospheric pressure reduction level judged. Hereinafter, how to determine the change in atmospheric pressure and how to adjust the heater power supplied to the magnetic head according to the change in atmospheric pressure with each method will be described. However, the atmospheric pressure in the magnetic disk apparatus may be measured with an aerotonometer, or a method other than the four methods described above.

First, how to detect a change of the atmospheric pressure in the magnetic disk apparatus 1 with the tracking accuracy method and determine the heater power cutback.

Figure 2:
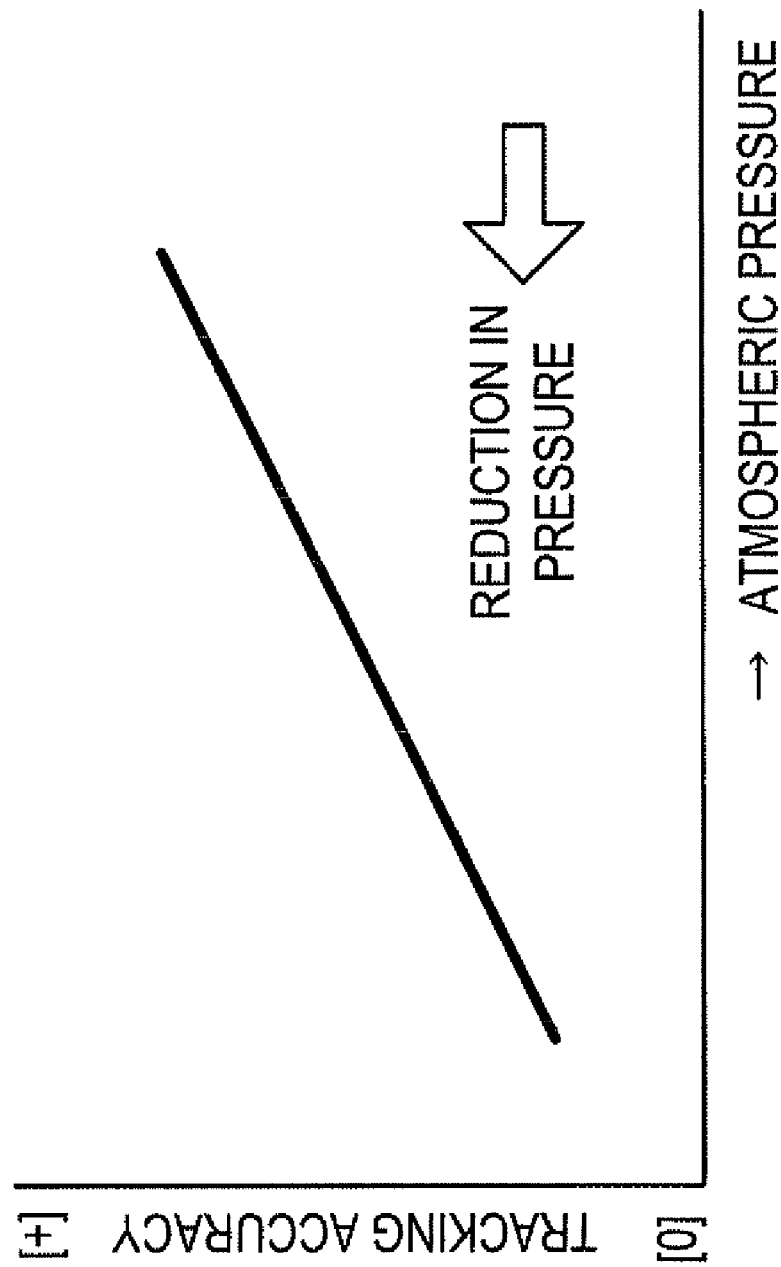
FIG. 2 shows a relationship between tracking accuracy and atmospheric pressure.

The relationship between the tracking accuracy and atmospheric pressure will be described with reference to the graph shown in FIG. 2. The longitudinal axis represents the atmospheric pressure and the lateral axis represents the tracking accuracy. As the atmospheric pressure increases, the tracking accuracy decreases.

Airflow is generated on the magnetic disk apparatus by a spinning medium. A slider, a suspension and an arm come under influence of the airflow. This wind disturbance exerts an effect on positioning accuracy of the magnetic head, or the tracking accuracy. In particular, when atmospheric pressure is reduced, the wind disturbance is reduced and the tracking accuracy will be improved.

The tracking accuracy method utilizes the relationship between the tracking accuracy and the atmospheric pressure.

Next, an example of a heater power adjustment table 44 for the tracking accuracy method will be described with reference to FIGS. 1 and 3.

Items of the heater power adjustment table 44 will be described. The atmospheric pressure reduction levels figure how much the atmospheric pressure is reduced from the normal atmospheric pressure—the atmospheric pressure at an inspection before shipping—as levels based on the on the on-track accuracies. Tracking accuracy differentials represent the differential between the tracking accuracy at the inspection and the current tracking accuracy. The heater power cutback represents how much the heater power, hp_ref, is reduced under the normal atmospheric pressure. For the tracking accuracy method, each item of the heater power adjustment table 44 is determined at a design phase of the magnetic disk apparatus 1. The magnetic disk apparatuses having the same design are provided with the same heater power adjustment tables 44. Alternatively, the tracking accuracy under the normal atmospheric pressure may be measured before shipping and the value of the accuracy may be stored in the system area on the medium.

When the atmospheric pressure reduction lever is below a specific value, i.e., level 0, it means that the atmospheric pressure is equal to the atmospheric pressure at the inspection—the normal atmospheric pressure—so the heater power is not cut back.

When the change of the atmospheric pressure is in excess of a threshold, the magnetic head 74 is retracted to avoid a contact with the medium 72. In this embodiment, the changes in atmospheric pressure are expressed in the atmospheric pressure reduction levels. When the atmospheric pressure reduction level exceeds the threshold, i.e., level 9, the VCM 73 retracts and unloads the magnetic head 74 to a (contact-start-stop) CSS area to avoid a head crash.

The lower limit of the atmospheric pressure, level 0, and the upper limit, level 9, are supplied to the spindle motor method, the AGC heater sensitivity method and the harmonic sensor method described later.

The process of the tracking accuracy method will be described with reference to the flow chart shown in FIG. 4, and FIG. 1. In this embodiment, the reference values for the magnetic disk apparatus 1 are measured and configured at the inspection before shipping. The change in atmospheric pressure in the magnetic disk apparatus 1, the atmospheric pressure reduction level, is determined based on the differential between the reference value and the measured value measured after shipping. The heater power cutback is determined according to the atmospheric pressure reduction level.

The tracking accuracy, tra [d], is measured as a reference value by the tracking accuracy measurement unit 33 in the inspection before shipping, in operation S1. The measurement result is stored in the system area in operation S2. Measuring and storing the tracking accuracy are conducted for each temperature range—the high temperatures, the normal temperatures and the low temperatures. Measuring and storing the tracking accuracy will be conducted for each magnetic head and zone when the magnetic disk apparatus 1 has multiple magnetic heads and zones. Measuring and storing the tracking accuracy for each magnetic head and zone will be described in detail later. Likewise, the inspection before shipping is conducted by temperature range.

Next, the process of the magnetic disk apparatus 1 after shipping will be described. The temperature measurement unit 23 judges whether a current temperature in the magnetic disk apparatus 1 measured by temperature measurement means (not shown in the accompanying drawings) falls into one of the temperature ranges. The temperature measurement unit 23 selects one of the heater power adjustment tables 44 according to the temperature range in operation S3. Thereafter, the tracking accuracy measurement unit 33 measures a current tracking accuracy, tra [t] in operation S4. The atmospheric pressure reduction monitor control unit 22 calculates a differential between tra [d] and tra [t] as ontdiff in operation S5.

The atmospheric pressure reduction monitor control unit 22 refers to the heater power adjustment table 44 selected in operation S6 and judges an atmospheric pressure reduction level according to intdiff in operation S7. Thereafter, the flying height control unit 21 determines the heater power cutback, hp_back, according to the atmospheric pressure reduction judged by the atmospheric pressure reduction monitor control unit with reference to the heater power adjustment table 44 in operation S8.

Next, the spindle motor method will be described. The spindle motor method detects the change in atmospheric pressure in the magnetic disk apparatus 1 by utilizing a current flowing through the spindle motor 71 (hereinafter referred to as a spindle motor current).

Figure 5:
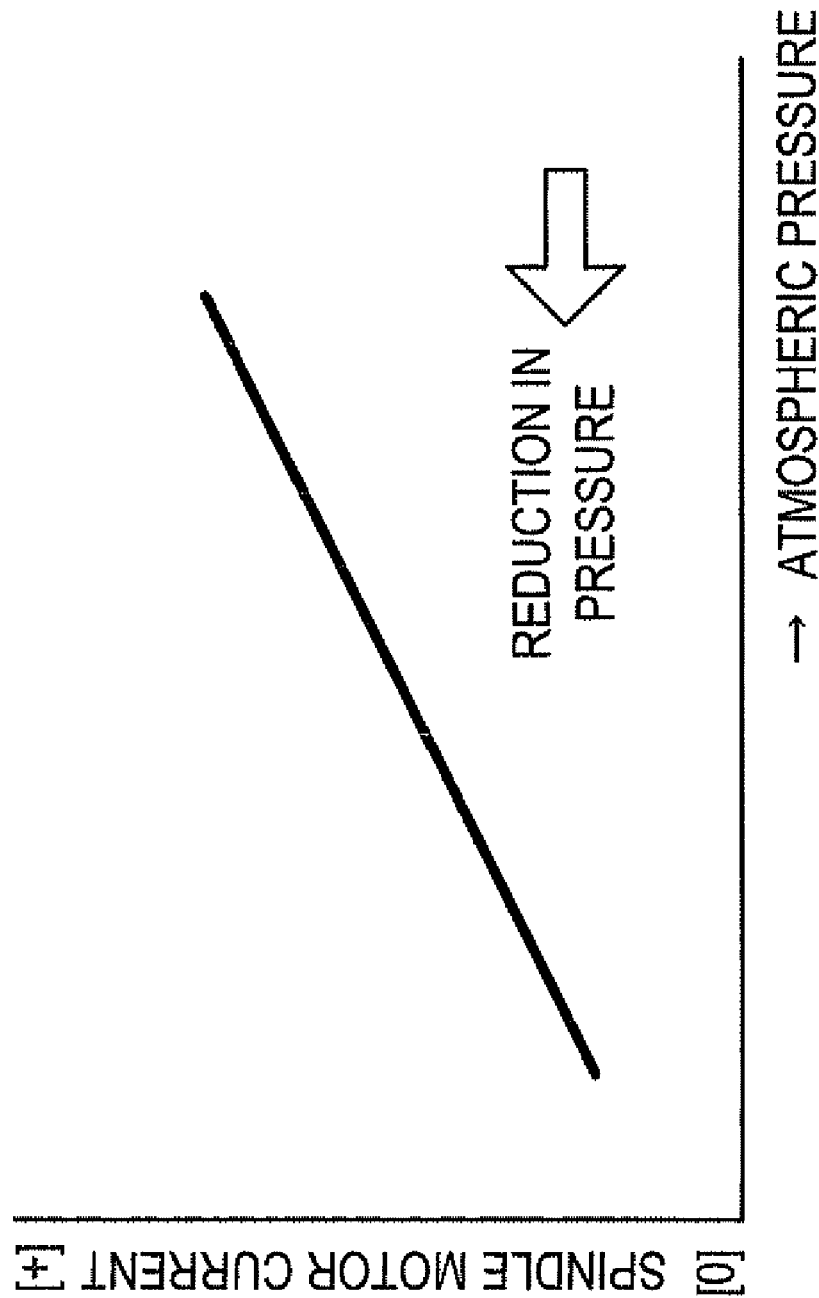
FIG. 5 is a graph showing a relationship between a current supplied to a spindle motor and the atmospheric pressure.

Here, the relationship between the spindle motor current and the atmospheric pressure will be described with reference to a graph shown in FIG. 5.

On the magnetic disk apparatus, the medium is rotated with the spindle by applying a current to the spindle motor. When the conditions are the same, the current supplied to the spindle motor may be the same. When the atmospheric pressure is reduced, the wind disturbance will be reduced and therefore a value of the spindle motor current will be reduced. Conversely, when the atmospheric pressure increases, the wind disturbance increases and therefore the spindle motor current will increase.

The spindle motor method utilizes the relationship between the spindle motor current and the atmospheric pressure.

Next, the process of the spindle motor method will be described with reference to the flow chart shown in FIG. 6, and FIG. 1.

A reference current flowing through the spindle motor 71, spm [d], is measured by the spindle motor current measurement unit 62 at the inspection before shipping in the operation S12. Then the measurement result is stored in the system area of a medium 72 in operation S12.

Next, the processes of the magnetic disk apparatus 1 after shipping will be described. The temperature measurement control unit 23 selects one of the heater power adjustment tables 44 from among the low temperatures, the normal temperatures and the high temperatures according to the current temperature in the magnetic disk apparatus 1 detected by the temperature detection means in operation S13. Thereafter, the spindle motor current measurement unit 62 measures a spindle motor current, spm [t], in operation S14. The atmospheric pressure reduction monitor control unit 22 calculates a differential between spm [d] and spm [t] as spmdiff in operation S15.

In operation S16, the atmospheric pressure reduction monitor control unit 22 refers to the heater power adjustment table 44 selected in operation S13, and judges the atmospheric pressure reduction level according to spmdiff in operation S17. Thereafter, the flying height control unit 21 determines the heater power cutback, hp_back, according to the atmospheric pressure reduction level judged by the atmospheric pressure reduction monitor control unit 22 with reference to the heater power adjustment control table 44 in operation S18.

FIG. 7 is an example of a heater power adjustment table 44, shown in FIG. 1, for the spindle motor method. The heater power adjustment table 44 shows the associations between the atmospheric pressure reduction levels, the differentials between the spindle motor currents and the heater power cutbacks. The atmospheric pressure reduction monitor control unit 22 determines the atmospheric pressure reduction level according to the differential of the spindle motor current calculated in operation S15 with reference to the heater power adjustment table 440. The flying height control unit 21 determines the heater power cutback according to the atmospheric pressure reduction level.

The AGC heater sensitivity method will be described. The AGC heater sensitivity method utilizes the heater sensitivity to monitor the change in atmospheric pressure in the magnetic disk apparatus 1 by utilizing.

First, the heater sensitivity in the AGC gain method will be described.

Generally, the AGC gain and the output from the magnetic head are correlative. As the output from the magnetic head increases, the AGC gain decreases. Conversely, as the output from the magnetic head decreases, the AGC gain increases.

In other words, the flying height is reduced and the output from the magnetic head increases with the decrease of the atmospheric pressure. Therefore, the AGC gain decreases. Conversely, as the atmospheric pressure increases, the flying height increases and the output from the magnetic head decreases. Therefore, the AGC gain increases. However, the characteristic may change slightly depending on a structure of the suspension. In addition, the output of the head may be saturated or head motion may become unstable when the flying height of the magnetic head 74 decreases.

Since the magnetic head is lifted with the airflow, the thermal expansion rate of the magnetic head may be changed depending on the atmospheric pressure. In brief, as the atmospheric pressure is reduced, the flying height decreases and a rate of thermal expansion of the magnetic head increases. Therefore, the change in AGC gain changes with the heater power change. In other words, the heater sensitivity may change depending on the atmospheric pressure. The heater sensitivity increases as the atmospheric pressure decreases.

Figure 8:
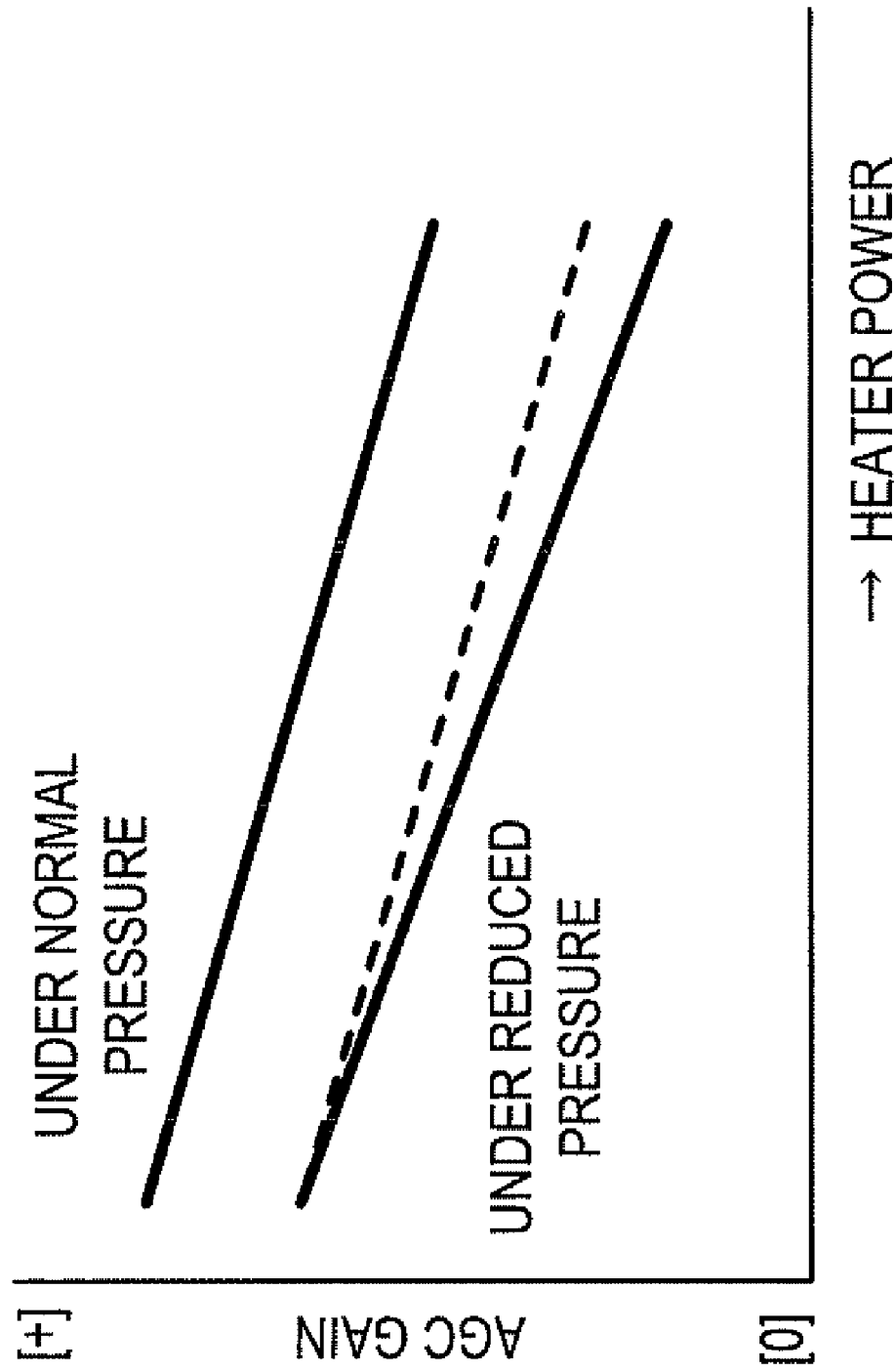
FIG. 8 is a graph showing a relationship between AGC gain and heater power.

The process of the AGC heater sensitivity will be described in detail with reference to FIG. 8. FIG. 8 is a graph showing the relationship between the AGC gains corresponding to the outputs from the magnetic head 74 and the heater power supplied to the magnetic head 74. The AGC gain corresponding to the atmospheric pressure decreases largely under the normal atmospheric pressure than under the reduced atmospheric pressure as shown in FIG. 8.

Figure 9:
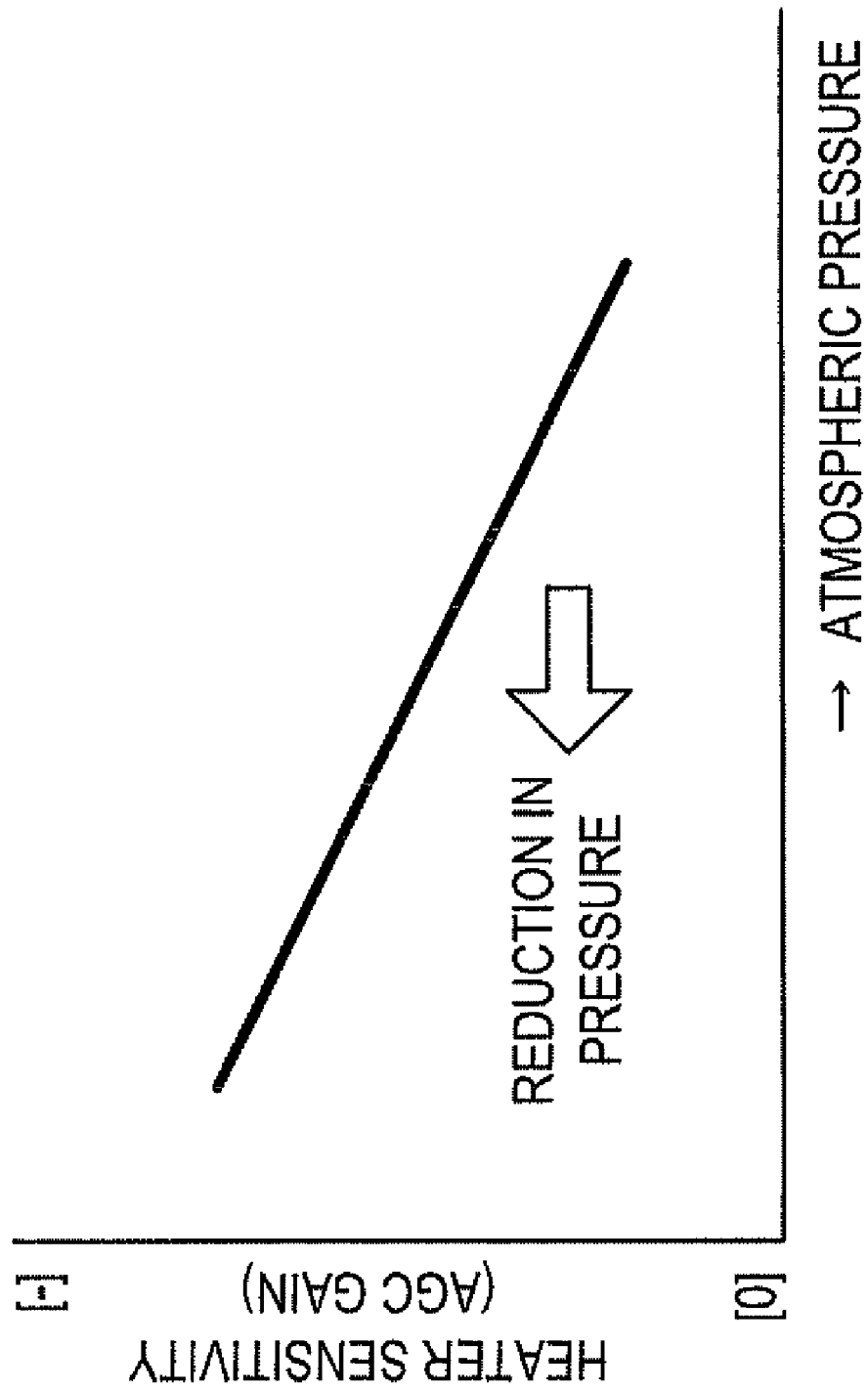
FIG. 9 is a graph showing a relationship between heater sensitivity of the AGC gain and the atmospheric pressure.

FIG. 9 is the graph showing the relationship between the heater sensitivity and the atmospheric pressure based on the relationship between the AGC gain and the heater power shown in FIG. 8. The heater sensitivity represents a ratio of the change in AGC gain corresponding to the output from the magnetic head 74 to the change in heater power. As the relationship between the heater sensitivity and the atmospheric pressure shows, the heater sensitivity decreases as the atmospheric pressure decreases. Conversely, as the atmospheric pressure increases, the heater sensitivity increases. Note the symbols on the longitudinal axis of the graph.

The AGC heater sensitivity method utilizes the relationship between the heater sensitivity and the atmospheric pressure.

Next, the AGC heater sensitivity will be described with reference to the flow chart shown at the right of FIG. 10, and FIG. 1.

The hard disk controller 11 writes data onto the medium 72 with the magnetic head 74 in operation S21. The flying height control unit 21 adjusts the heater power supplied to the heating circuit embedded in the magnetic head 74 to the specific value, hp1, in operation S22. The hard disk controller 11 reads the data written in operation S21 with the magnetic head 74 in operation S23. The AGC gain measurement unit 31 measures the AGC gain, AGC [d1], obtained when the heater power, hp1, is supplied.

The flying height control unit 21 controls the heater power to hp2 in operation S24. The hard disk controller 11 reads the data written in operation S21 with the magnetic head 74 in operation S25. The AGC gain measurement unit 31 measures the AGC gain, AGC [d2], obtained when the heater power, hp2, is supplied. The atmospheric pressure reduction monitor control unit 22 calculates the heater sensitivity, hp_sens [d], in operation S26. The heater sensitivity calculated in operation S26 is used as the reference value and stored in the initial data region 45.

Here, a calculation method of the heater sensitivity will be described.

where

Xn=hp1, hp2, . . . , hpn: heater power [bit] to be measured

Yn=AGC [hp1], AGC [hp2], . . . , AGC [hpn]: AGC gain [gain] obtained by each heater power Hp_sens: hater sensitivity [gain/bit]

hp_sens are given by

[formula 1]

Figure 10:
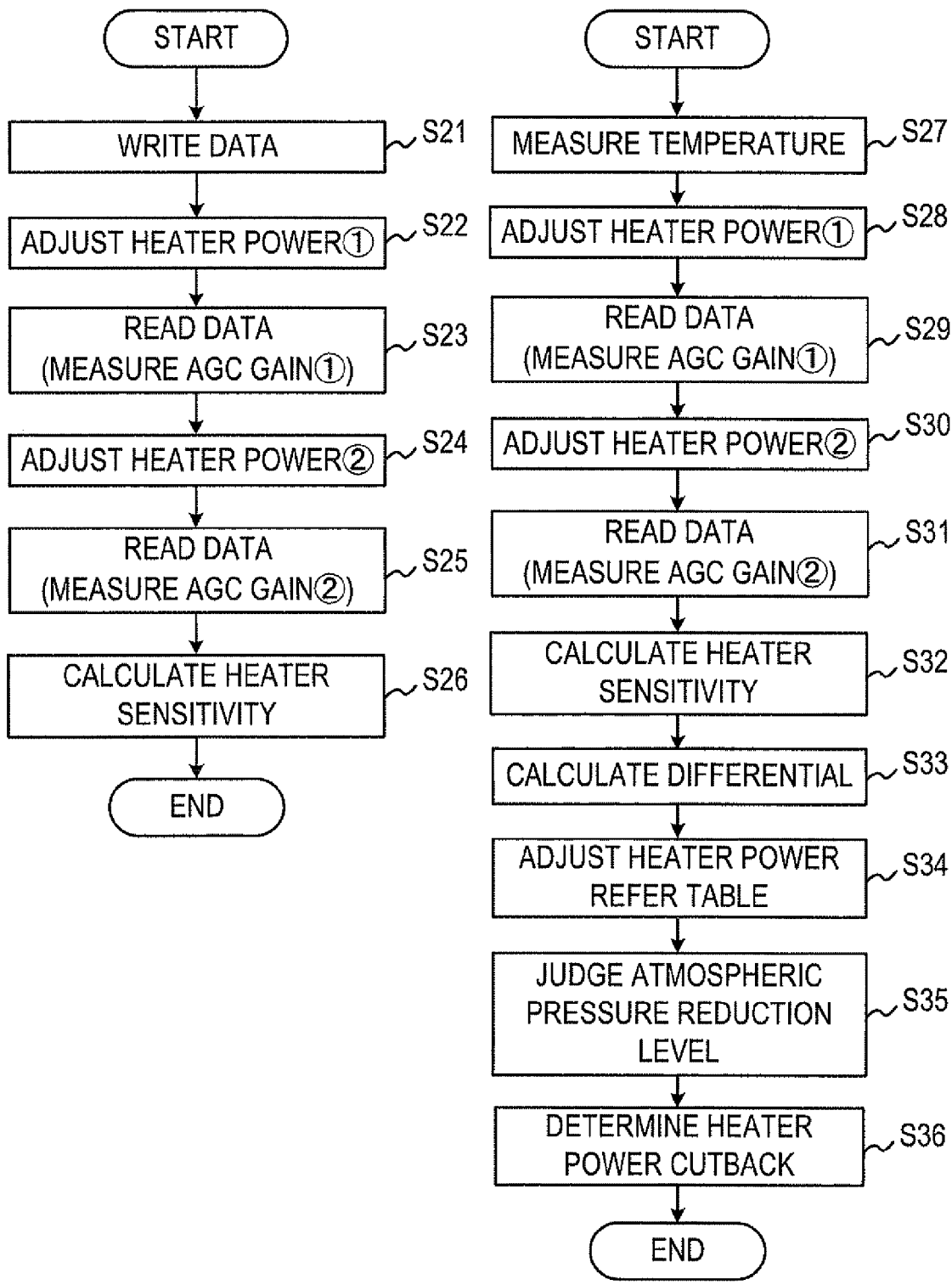
FIG. 10 is a flow chart illustrating a process of an AGC heater sensitivity.

When the heater power values are measured twice as shown in FIG. 10 and therefore, two values of the AGC gains are obtained. The heater power value is given by $$hp\_sens[d]=(AGC[d1]-AGC[d2])/(hp1-hp2)$$

Refer to FIG. 11, the inspection before shipping.

Next, the process of the magnetic disk apparatus 1 after shipping will be described with reference to the flow chart shown at the left of FIG. 10, and FIG. 1. The temperature measurement control unit 23 selects one of the heater power adjustment tables 44 from among the low temperatures, the normal temperatures and the high temperatures according to the current temperature in the magnetic disk apparatus 1 detected by the temperature diction means not shown in the accompanying drawings in operation S27. In operation S28, the flying height control unit 21 adjusts the heater power to hp1 likewise in operation S22. The hard disk controller 11 reads the data written in operation S21 with the magnetic head 74 in operation S29. The AGC gain measurement unit 31 measures the AGC gain, AGC [t1], obtained when the heater power, hp1, is supplied.

In operation S30, the flying height control unit 21 adjusts the heater power to hp2 likewise in operation S24. The hard disk controller 11 reads the data written in operation S21 with the magnetic head 74 in operation S31. The AGC gain measurement unit 31 measures the AGC gain, AGC [t2], obtained when the heater power, hp2, is supplied. The atmospheric pressure reduction monitor control unit 22 calculates the heater sensitivity, hp_sens [t], according to AGC [t1], AGC [t2], hp1 and hp2 in operation S32.

The atmospheric pressure reduction monitor control unit 22 calculates a differential between the reference heater sensitivity, hp_sens [d], and hp_sens [t] calculated after shipping in the AGC gain method as hp_diff in operation S33.

The heater power according to the AGC gain measured after shipping will be given by the following equation as well as the heater power calculated before shipping. Refer to the graph, after shipping, shown in FIG. 11.

$$hp\_sens[t]=(AGC[t1]-AGC[t2])/(hp1-hp2)$$

and hp_diff is given by $$hp\_diff=hp\_sens[d]-hp\_sens[t]$$

Operations S34 through S36 are omitted to avoid an overlap with the descriptions of the tracking accuracy method and the spindle motor method.

FIG. 12 is an example of a heater power adjustment table 44, shown in FIG. 1, for the AGC heater sensitivity method. The heater power adjustment table 44 provides the atmospheric pressure reduction levels and correspondent differentials between the heater sensitivities and the heater power cutbacks. The atmospheric pressure reduction monitor control unit 22 determines the atmospheric pressure reduction level from the differential between the heater sensitivities, hp_diff with reference to the heater power adjustment table 44. The flying height control unit 21 determines the heater power cutback according to the atmospheric pressure reduction level determined.

Figure 13:
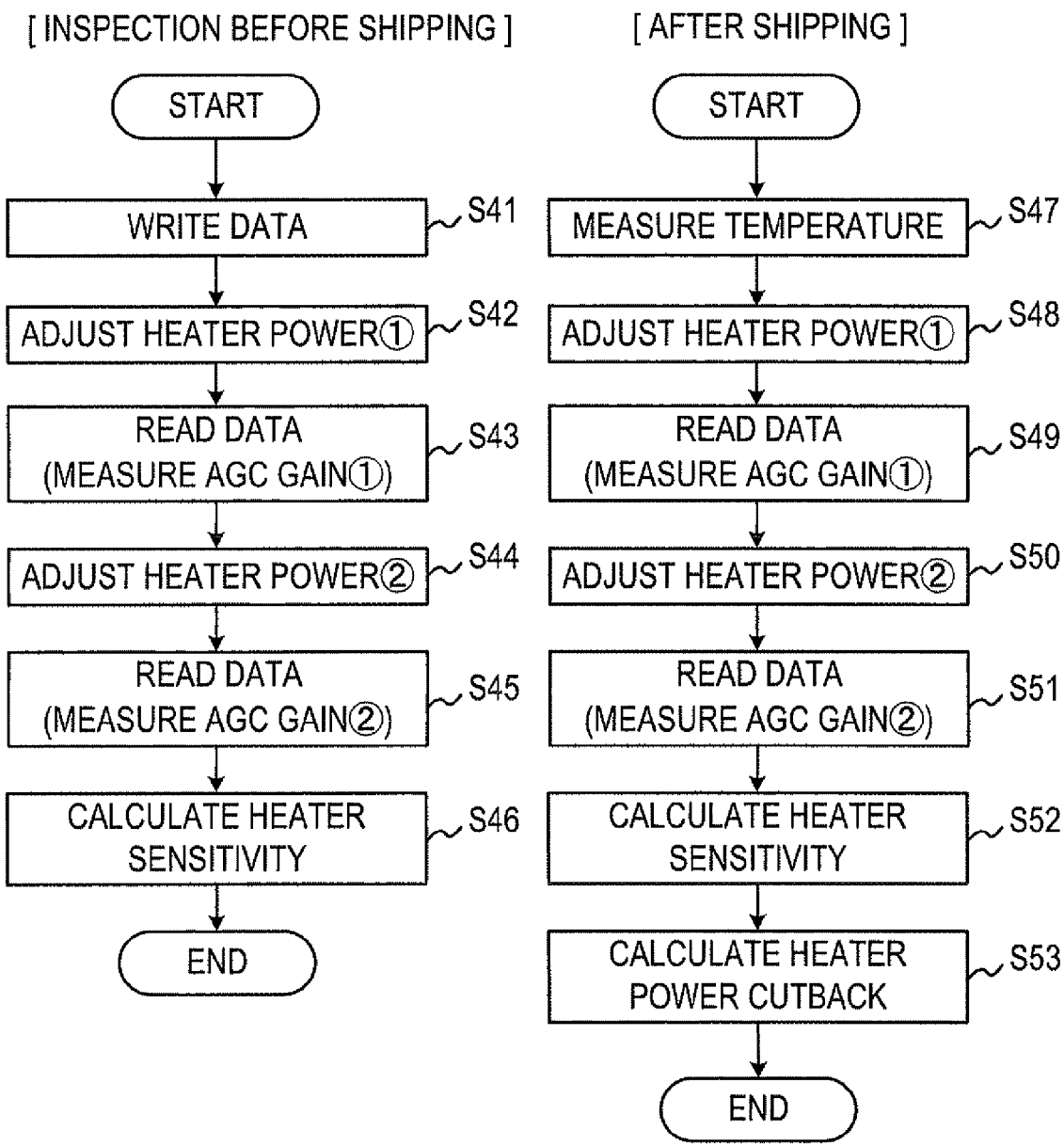
FIG. 13 is a flow chart of a process of the AGC heater sensitivity method, or a heater power cutback calculation.
Figure 14:
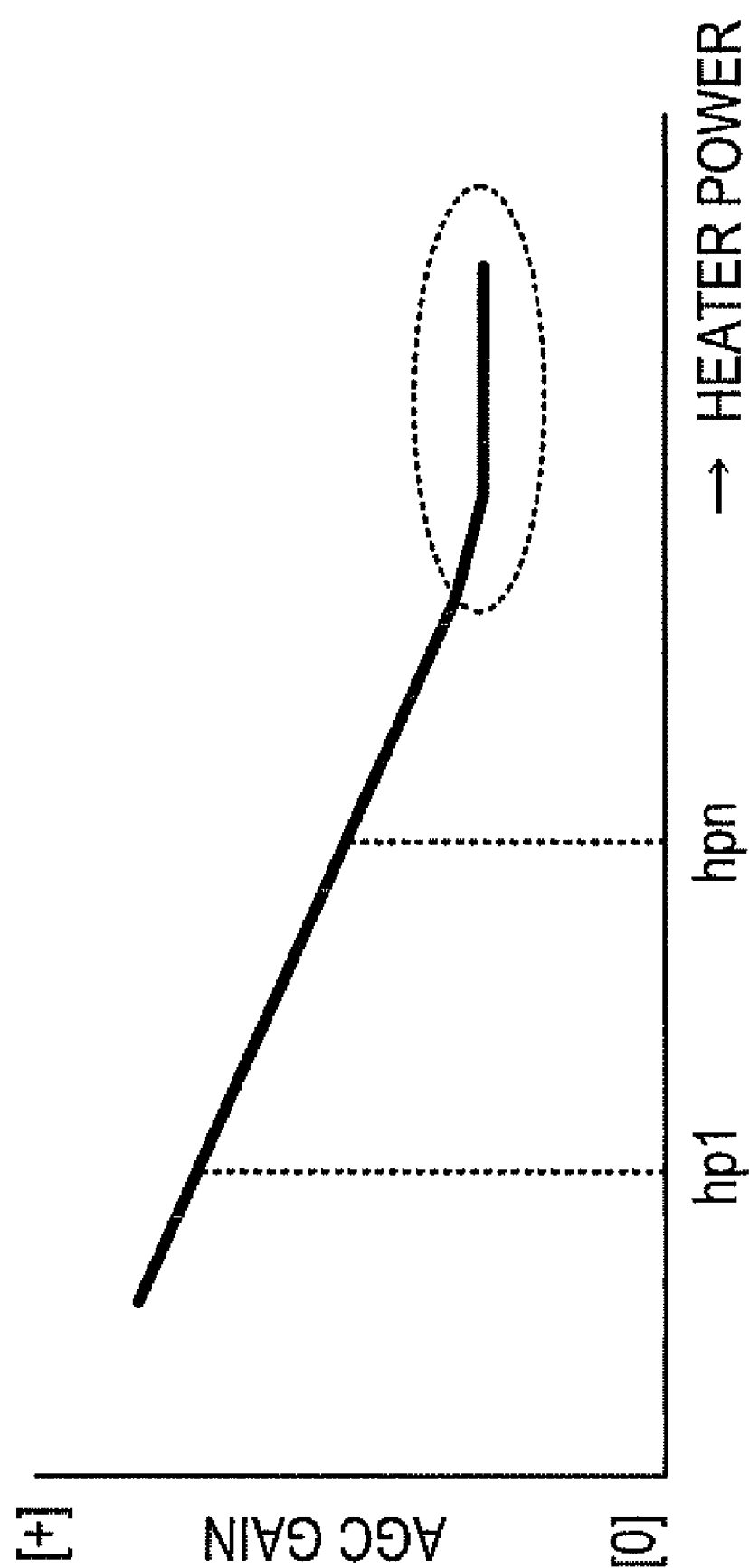
FIG. 14 is a graph illustrating items of the AGC heater sensitivity method.

In the AGC heater sensitivity method, the heater power cutback is determined with reference to the heater power adjustment table 44. Alternatively, the heater power cutback may be determined with equation 2. How to determine the heater power cutback with the equation will be described with reference to the flow chart shown in FIG. 13, and FIG. 1. Operations S41 through S52 are omitted to avoid the overlaps. Refer to operation S21 through S32.

After calculating the heater sensitivity after shipping in operation S52, the flying height control unit 21 calculates the heater power cutback.

When

AGC [d1]: an AGC gain reference value [gain] with the heater power, hp1

AGC [t1]: a current AGC gain value [gain] with the heater power, hp1 hp_sens [d]: a reference value of the heater sensitivity [gain/bit]

hp_sens [t]: a current value of the heater sensitivity [gain/bit]

hp_ref: a heater power under normal atmospheric pressure [bit]

hp_diff is given by

[formula 2]

As the clearance between the magnetic head 74 and the medium 72 decreases, the AGC gain is saturated after a point and the heater power becomes substantially constant. Therefore, the value of the heater power is configured to be as low as possible in order not to saturate the output from the magnetic head 74.

Next, the harmonic sensor method will be described. The harmonic sensor method utilizes the heater sensitivity to monitor the changes in atmospheric pressure.

Figure 15:
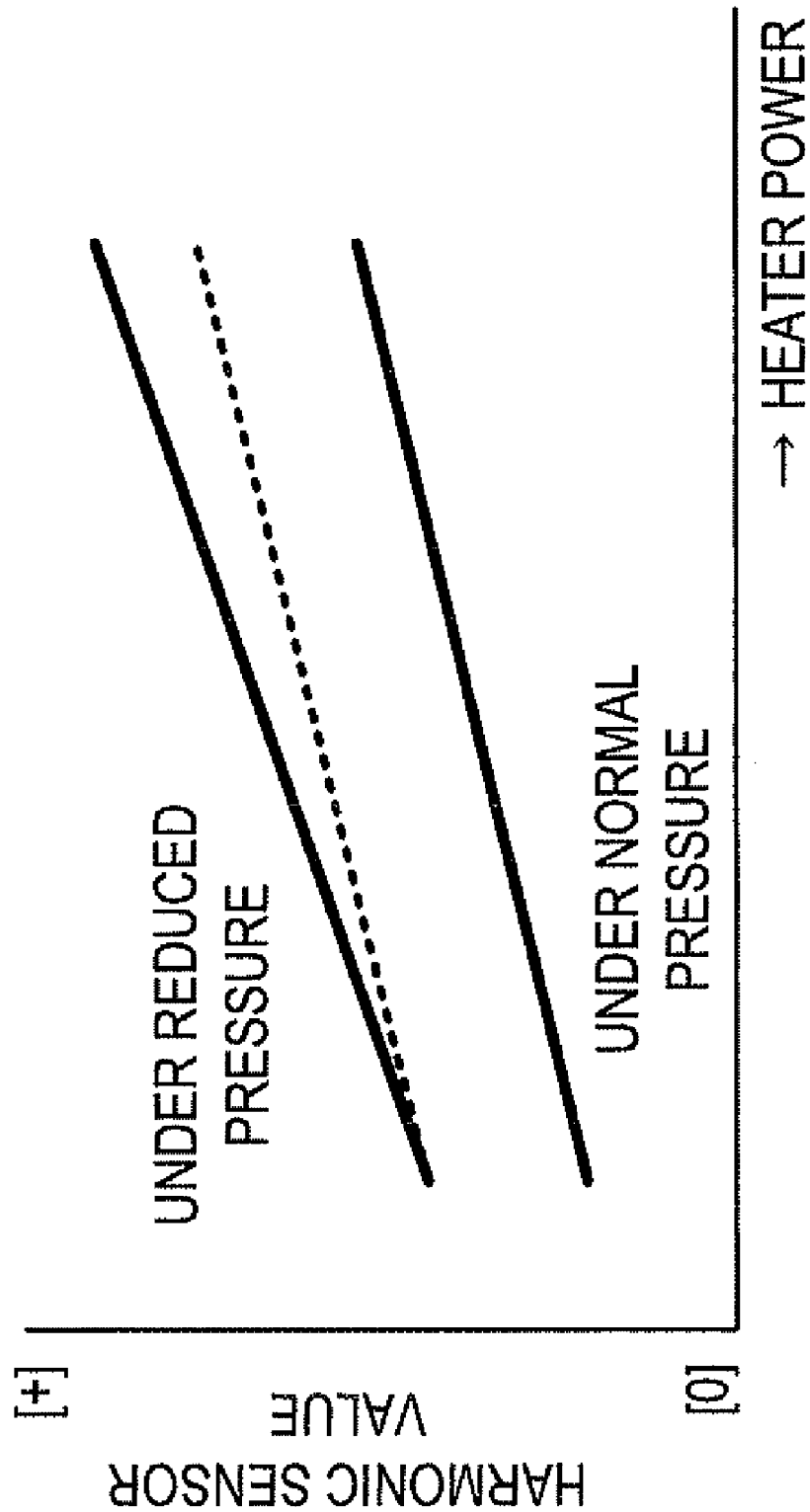
FIG. 15 is a graph showing a relationship between harmonic sensor value and the heater power.

The harmonic sensor is one of the functions of the RDC 30, which to obtain the specific frequency element output from the magnetic head 74 and to convert the specific frequency element into figures. Generally, values obtained by the harmonic sensor (hereinafter referred to as harmonic sensor values) and the outputs from the magnetic head are correlative. As the output from the magnetic head increases, the harmonic sensor value increase as shown in FIG. 15. Conversely, as the output from the magnetic head decreases, the harmonic sensor value decreases.

In short, in contrast to the AGC heater sensitivity method, as the atmospheric pressure decreases, the flying height of the magnetic head decreases. Therefore the output from the magnetic head increases and the harmonic sensor value increases. As the atmospheric pressure increases, the flying height increases. Therefore, the output from the magnetic head decreases and the harmonic sensor value decreases. However, this characteristic may change slightly depending on a structure of the suspension, the output from the magnetic head is saturated or the behavior of the head becomes unstable as previously mentioned.

Figure 16:
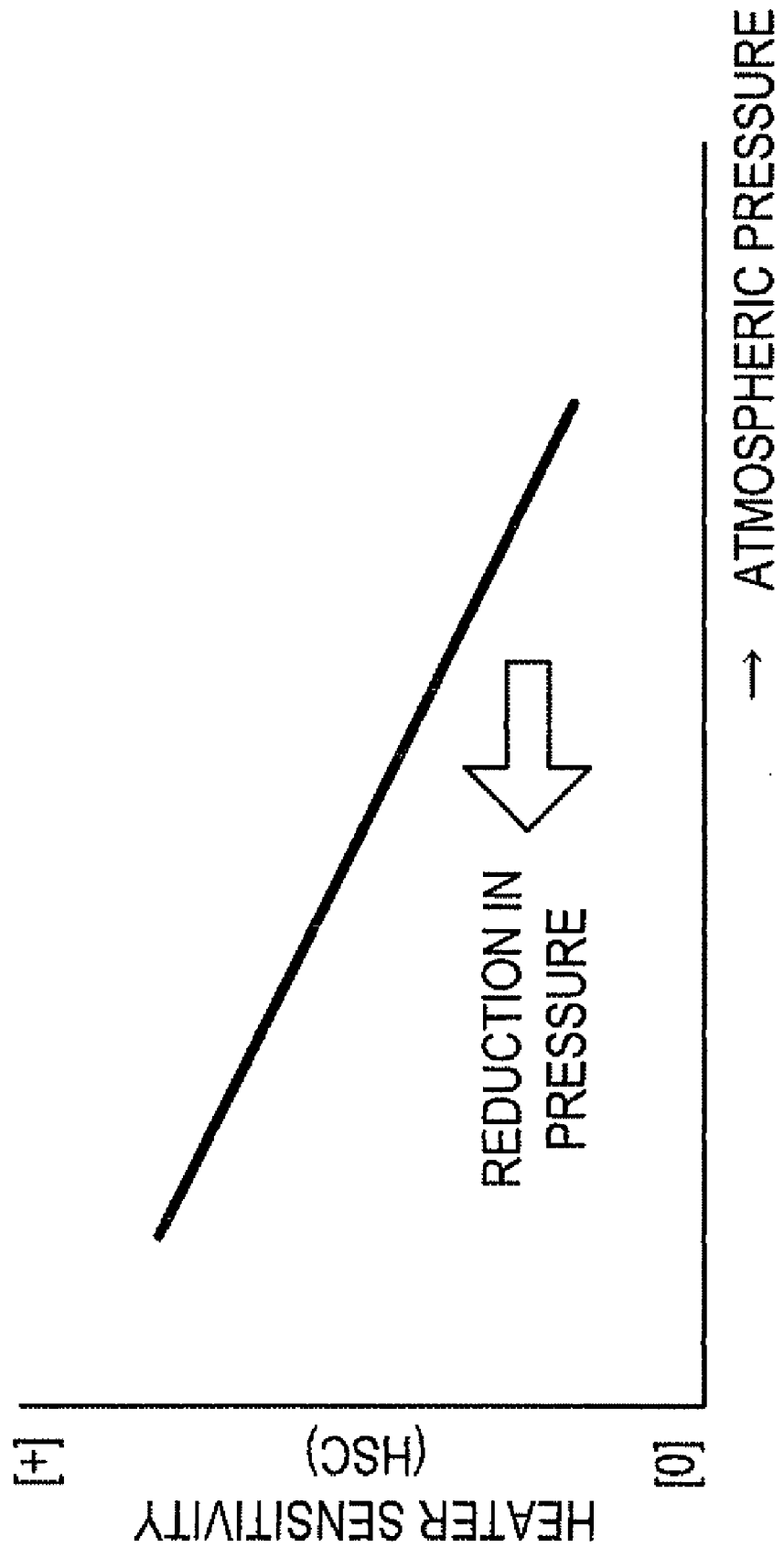
FIG. 16 is a graph showing a relationship between the heater sensitivity of the AGC gain and the atmospheric pressure.

Further, the magnetic head is lifted with the airflow and the thermal expansion rate of the magnetic head may change depending on atmospheric pressures. As the atmospheric pressure decreases, the lift decreases and the thermal expansion rate of the magnetic head decreases. The heater sensitivity in the harmonic sensor method represents changes of the harmonic sensor values with the thermal dose and the heater sensitivity depends on the atmospheric pressure. In contrast to the AGC heater sensitivity method, the heater sensitivity will be high as the atmospheric pressure decreases. The heater sensitivity decreases as the atmospheric pressure increases. Note the plus and minus symbols shown in FIGS. 9 and 16 are opposite.

The harmonic sensor will be described with reference to the flow chart shown in FIG. 17, and FIG. 1. According to the AGC heater sensitivity method, the harmonic sensor values measured in the inspection before shipping in operations S63 and S65 are defined as hsc [d1] and hsc [d2], respectively. A calculation method of the heater sensitivity in operations S68 and S71 will be described in accordance with the harmonic sensor values. For the rest of the operations, refer to the description of the AGC heater sensitivity method in operations S21 through S36.

The atmospheric pressure reduction monitor control unit 22 calculates the heater sensitivities in operations S66 and S72 according to the harmonic sensor values measured, hsc [d1], hsc [d2], hsc [t1] and hsc [t2] and the heater powers hp1 and hp2 adjusted in operations S62 and S64.

When

Xn=hp1, hp2, . . . , hpn: heater power [bit] to be measured

Yn=hsc [hp1], hsc [hp2], . . . , hsc [hpn]: harmonic sensor values [hsc] with each heater power Hp_sens: heater sensitivities [hsc/bit]

Hp_sens is given by

[formula 3]

Figure 17:
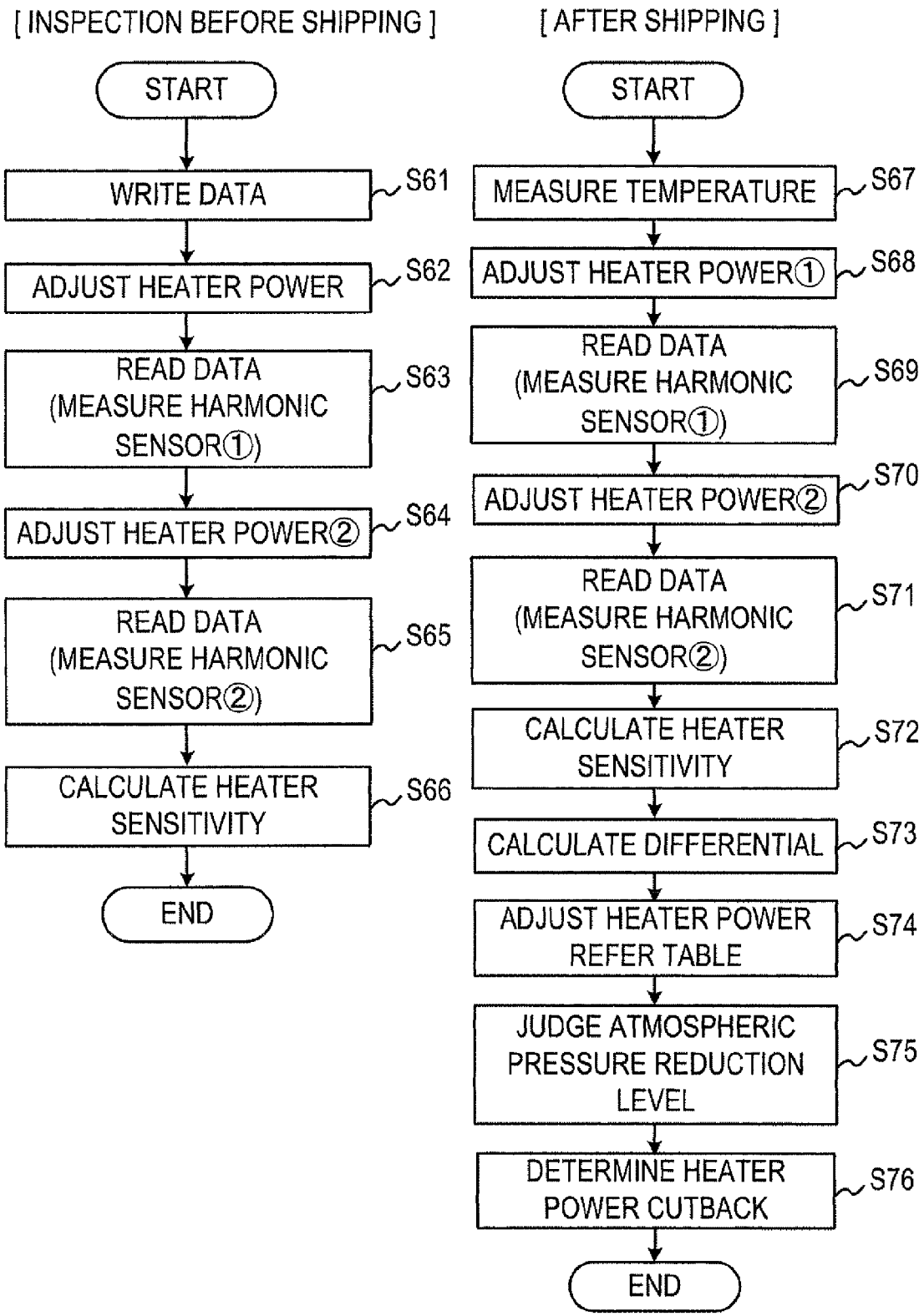
FIG. 17 is a flow chart illustrating a process of the harmonic sensor method.

When the heater power is measured twice as shown in FIG. 17, two harmonic sensor values are obtained. A harmonic sensor value before shipping is given by $$Hp\_sens[d]=(hsc[d1]-hsc[d2])/(hp1-hp2)$$

Refer to FIG. 18.

A harmonic value after shipping is given by $$Hp\_sens[t]=(hsc[t1]-hsc[t2])/(hp1-hp2)$$

A differential between the heater sensitivities, hp_diff is given by $$Hp\_diff=hp\_sens[d]-hp\_sens[t]$$

FIG. 19 is an example of a heater power adjustment table 44, shown in FIG. 1, for the harmonic sensor method. The heater power adjustment table 44 for the harmonic sensor provides the atmospheric pressure reduction levels and correspondent heater sensitivity differentials and the heater power cutbacks. The atmospheric pressure reduction monitor control unit 22 determines the atmospheric pressure reduction level from the differential between the heater sensitivities with reference to the heater power adjustment table 44. Then the flying height control unit 21 determines the heater power cutback according to the atmospheric pressure reduction level determined.

The flying height control unit 21 determines an optimum heater power cutback depending on the atmospheric pressure by using one of the methods: the tracking accuracy method, the spindle motor method, the AGC heater sensitivity method and the harmonic sensor method.

The actual heater power is derived by subtracting the heater power cutback from the heater power under the normal atmospheric pressure in the inspection before shipping.

where
hp_ref: a heater power [bit] under the normal atmospheric pressure
hp_diff: a heater power cutback [bit]
the actual heater power, hp_act is given by $$hp\_act = hp\_ref - hp\_diff$$

The values of hp_act are stored in the heater power configuration table 41.

Then the flying height control unit 21 adjusts the heater power supplied to the magnetic head 74 by adjusting the current flowing through the heating circuit embedded in the magnetic head 74 according to hp_act calculated. The magnetic head 74 is expanded with the heater power and the flying height of the magnetic head 74 is controlled.

When the magnetic disk apparatus 1 has multiple magnetic heads or tracks on the medium is divided into multiple zones, obtain the heater power in accordance with the changes in atmospheric pressure by magnetic head or zone to achieve the optimum flying height. When the magnetic disk apparatus is incorporated the multiple medium, the multiple magnetic head are provided correspondingly. FIG. 20 shows the flow charts illustrating the processes to determine the heater power cutbacks by magnetic head or zone. Magnetic head information and zone information are stored in the system area of the medium. Alternatively, the information may be configured arbitrary.

The inspection process before shipping will be described. The process control unit 24 selects magnetic heads to be processed according to the magnetic information in operation S81 and then selects zones to be processed according to the zone information in operation S82. The process control unit 24 measures reference values with any of the methods in operation S83: the tracking accuracy method, AGC heater sensitivity method or the harmonic sensor method. In operation S84, the process control unit 24 judges whether the process is completed. When the processes of all of the zones are confirmed not completed in operation S84, the process control unit 24 commands to process the rest of the zones to be processed in operation S82.

When the processes of all of the zones are confirmed completed in operation S84, then the process control unit 24 judges whether the processes of all of the magnetic heads are completed in operation S85. When the processes of all of the magnetic head are confirmed not completed in operation S85, the process control unit 24 commands to process the rest of the magnetic heads to be processed in operation S81. When all of the magnetic head are processed in operation S85, the process control unit 24 terminates the process.

Next, the process after shipping will be described. Magnetic heads and zones to be processed are selected according to the magnetic head information and the zone information in operations S86 and S87. The heater power cutback is calculated with one of the following methods: the tracking accuracy method, the AGC heater sensitivity method or the harmonic sensor method in operation S88.

Operations S87 to S89 or operations S86 to S90 will be repeated until the heater power corresponding to all of the magnetic heads and the zones is derived.

After the heater power to all of the magnetic heads and the zones is calculated, the process control unit 24 determines the heater power corresponding to the zones not selected to be processed in operation S91. The heater power corresponding to the unprocessed zones may be determined by, for example, averaging the heater power corresponding to the selected zones situated around the zones not selected.

The flying height control unit 21 reflects the heater power cutbacks derived to the heater power cutback table 43 in operation S92.

The actual heater power is derived by subtracting the heater power cutback from the reference value of the heater power determined in the inspection process before shipment. The flying height control unit 21 controls the flying height of the magnetic head 74 by adjusting the current supplied to the heating circuit embedded in the magnetic head 74.

Figure 21:
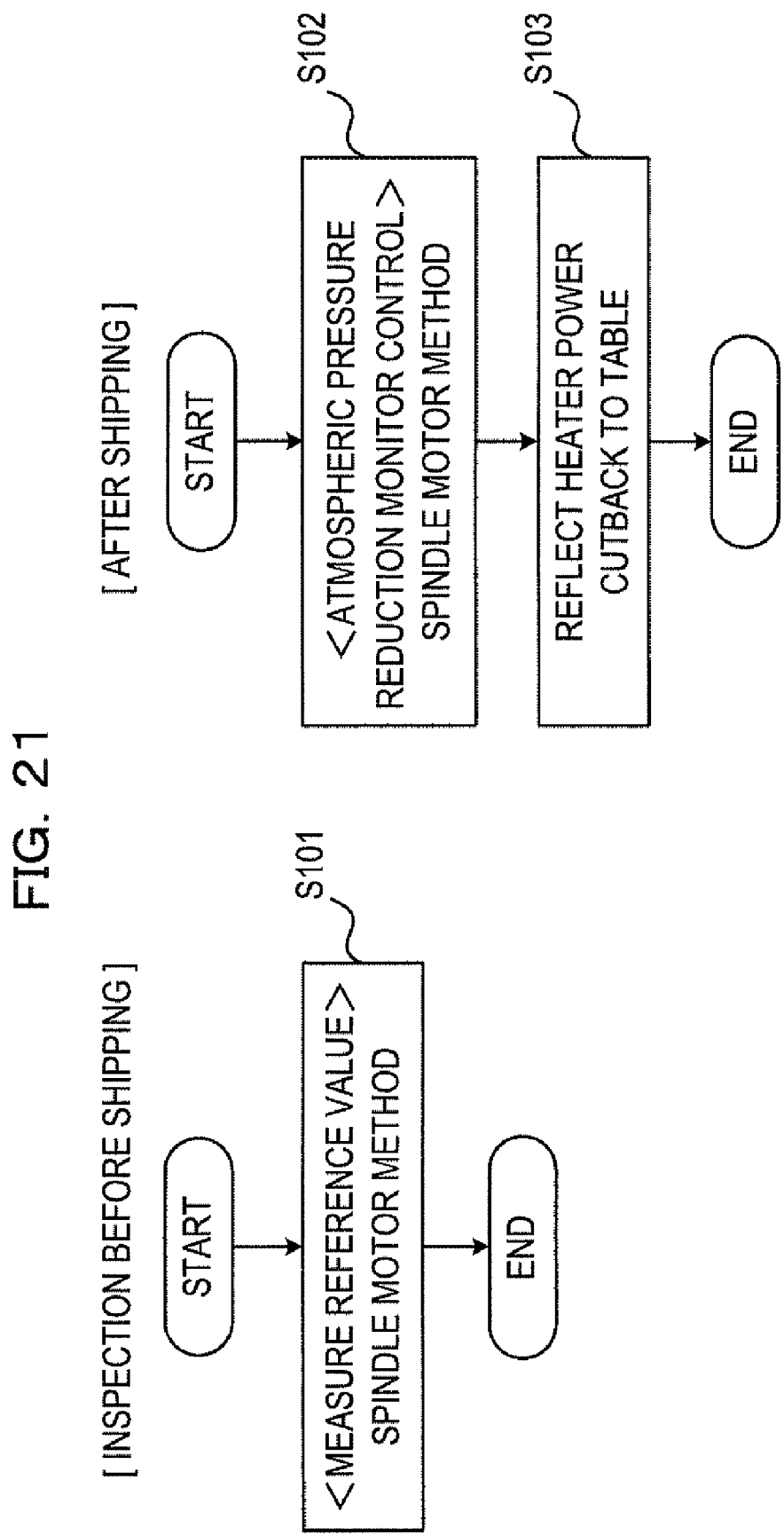
FIG. 21 shows flow charts illustrating processes of multiple magnetic heads and zones with the spindle motor method.
Figure 22:
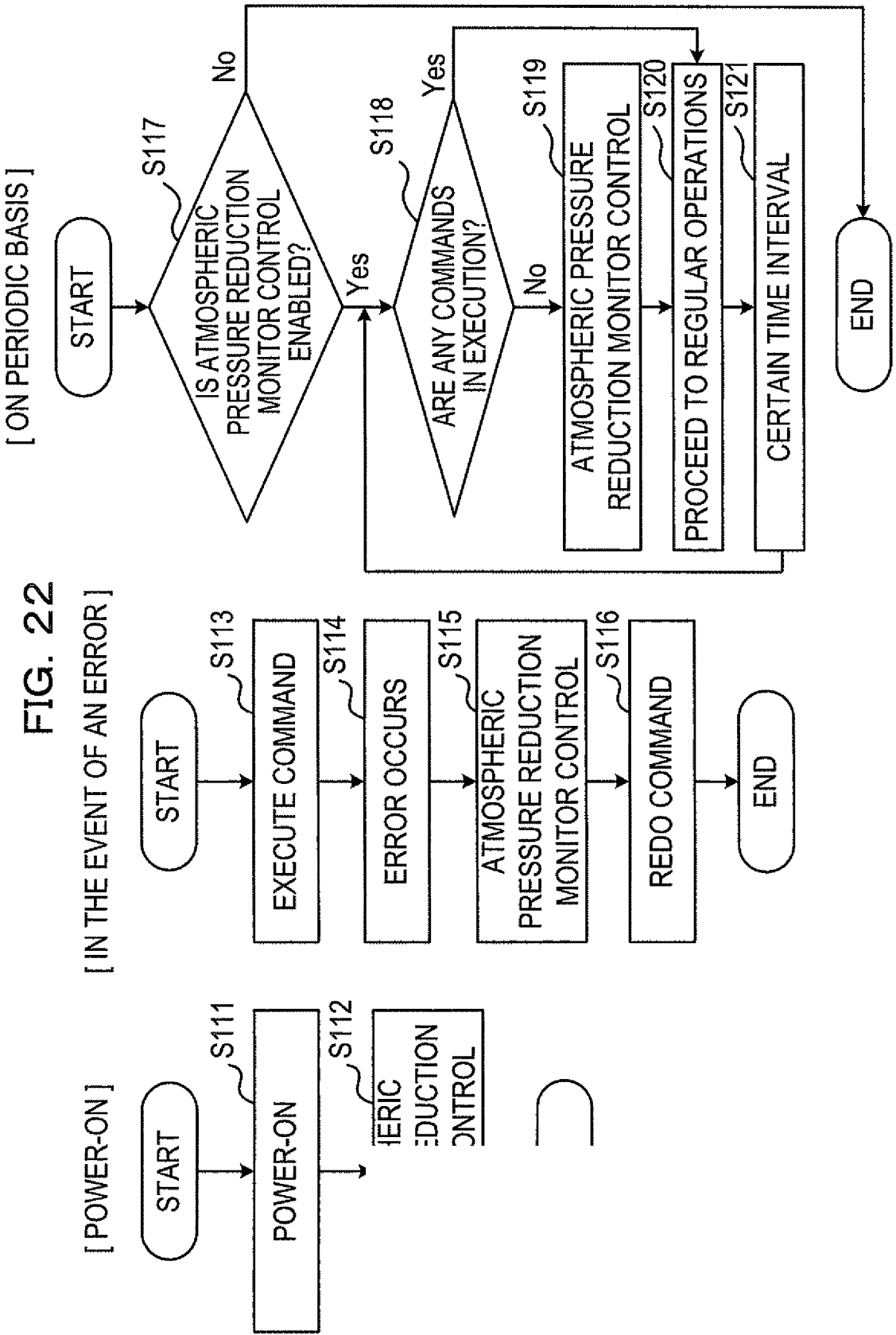
FIG. 22 shows flow charts illustrating a process of an atmospheric pressure reduction monitor control.

The heater power cutbacks are determined by magnetic head or zone with the tracking accuracy method, the AGC sensitivity method and the harmonic sensor method. The heater power cutbacks are determined based on the spindle a current supplied to the spindle motor. Refer to FIG. 21.

The process control unit 24 measures the reference value as previously described in the inspection before shipping in operation S101. After shipping, the heater power cutback is determined in operation S102. The process control unit 24 reflects the heater power cutback to the heater power cutback table 43 in operation S103.

The actual heater power is derived by subtracting the heater power cutback from the reference value of the heater power determined in the inspection process before shipment. The flying height control unit 21 controls the flying height of the magnetic head 74 by adjusting the current supplied to the heating circuit embedded in the magnetic head 74.

Now, atmospheric pressure reduction monitor control will be described.

The atmospheric pressure reduction monitor control is to monitor the changes in atmospheric pressure in the magnetic disk apparatus 1 and to adjust the heater power according to the changes. Measurement timings of the atmospheric pressure in the magnetic apparatus 1 are selected from: 1. power-on; 2. in the event of an error; 3. arbitrary time intervals. The measurement timing configuration table 42 stores flags corresponding to the measurement timings on power-on, in the event of an error and at the arbitrary time intervals. The process control unit 24 measures the atmospheric pressure in the magnetic disk apparatus 1 according to the flags. The flags may be configured arbitrarily by users.

Firstly, the measurement of the atmospheric pressure in the magnetic disk apparatus 1 on power-on will be described. The measurement of the atmospheric pressure on power-on is conducted in operation S112 after the host, a basic input-output system (BIOS), is powered on in operation S111.

Next, the measurement of the atmospheric pressure in the event of an error will be described. The hard disk controller 11 executes a command issued by the host, i.e., a read command, in operation S113. If the hard disk controller 11 fails to execute the command, an error occurs in operation S114, the process control unit 24 measures the atmospheric pressure in the magnetic disk apparatus 1 in operation S115. After measuring the atmospheric pressure, the hard disk controller 11 redoes the command in operation S116.

Lastly, the measurement of the atmospheric pressure will be described. The measurement timing configuration table 42 stores values of the time intervals configured arbitrarily. In other words, the measurement timing configuration table 42 stores information about how often the measurements are conducted.

The process control unit 24 judges whether the periodic measurements of the atmospheric pressure are enabled or disabled, i.e., a flag in the measurement timing configuration table 42 is ON or OFF, or a jumper switch is ON of OFF in operation S117. When the periodic measurements are judged enabled in operation S117, the process control unit 24 checks that any commands are in execution in operation S118. When no commands are confirmed to be in execution in operation S118, the process control unit 24 measures the atmospheric pressure in the magnetic disk apparatus 1 in operation S119. After measuring the atmospheric pressure, the magnetic disk apparatus 1 precedes the regular operations in operation S120.

When the periodic measurements are judged not to be enabled in operation S117, the periodic measurement is terminated. When any commands are confirmed not in execution in operation S117, the process moves on to operation S120. When any commands are confirmed in execution in operation S118, the process moves on to operation S120.

The atmospheric pressure may be monitored substantially in real time by configuring time intervals stored in the measurement timing configuration table 42.

Figure 23:
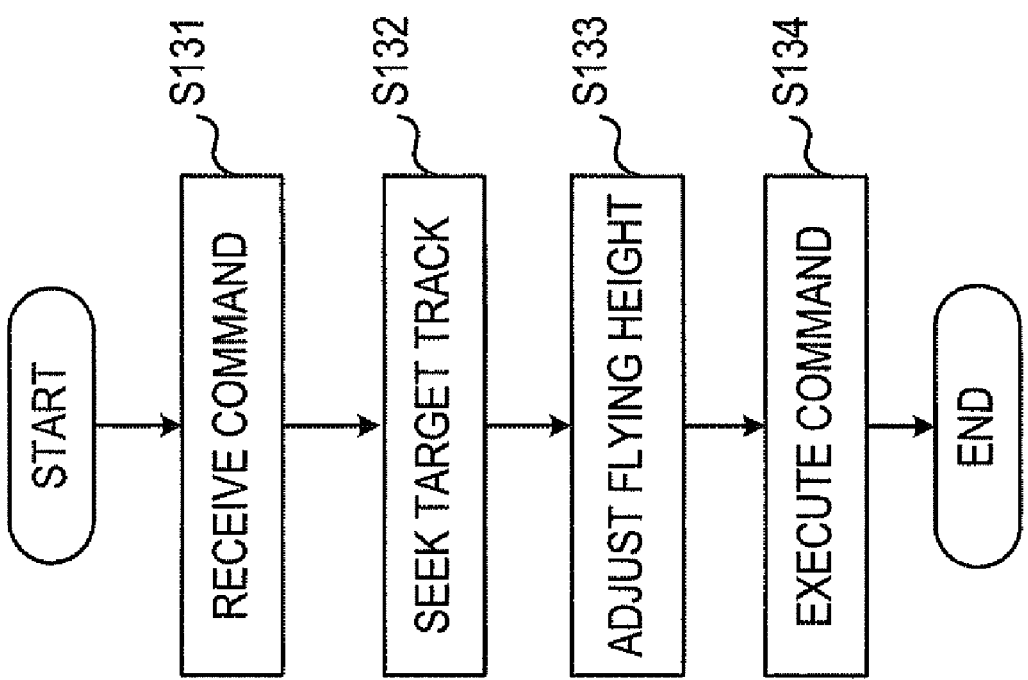
FIG. 23 is a flow chart illustrating a process of a flying height control.

The magnetic disk apparatus 1 adjusts the flying height of the magnetic head 74 during data writing and reading. The flying height of the magnetic head 74 is adjusted by utilizing the heater power determined in the atmospheric pressure reduction monitor control process. Refer to FIG. 23.

The hard disk controller 11 receives a command issued from the host in operation S131. The VCM 73 seeks a target track with the magnetic head 74 in operation S132. The process control unit 24 adjusts the flying height in operation S133. Then the hard disk controller 11 executes the command received in operation S134.

Alternatively, the magnetic disk apparatus 1 may read and check data written under the reduced atmospheric pressure for error. For example, where the atmospheric pressure in the magnetic disk apparatus 1 is judged normal, in other words, atmospheric pressure reduction level 0, data—particularly the data written under the reduced atmospheric pressure, may be read and checked in idle time for errors. If any errors are found, the flying height control unit 21 increases the heater power and rereads the data. If the data are read with the increased heater power, the data may be rewritten.

Accordingly, the magnetic head keeps an adequate clearance from the medium under any atmospheric pressures. Therefore, the head crashes with the medium may be prevented and data reliability may be improved.

Although a few preferred embodiments of the present application have been shown and described, it would be appreciated by those skilled in the art that changes may be made in these embodiments without departing from the principles and spirit of the application, the scope of which is defined in the claims and their equivalents.

What is claimed is:

1. A magnetic disk apparatus, comprising:
   a heater for heating a head incorporated in the magnetic disk apparatus;
   an atmospheric pressure detector for detecting a change in atmospheric pressure in the magnetic disk apparatus; and
   an adjuster for adjusting a thermal dose supplied to the head by the heater according to the change in atmospheric pressure detected by the atmospheric pressure detector,
   wherein the atmospheric pressure detector detects a change in atmospheric pressure according to a ratio between a change of AGC (automatic gain control) gain corresponding to an output from the head and a change of the thermal dose.

2. The magnetic disk apparatus according to claim 1,
   wherein the atmospheric pressure detector detects a change in atmospheric pressure in powering on the magnetic disk apparatus, and the adjuster adjusts the thermal dose supplied to the head by the heater after the atmospheric pressure detector detects the change in atmospheric pressure.

3. The magnetic disk apparatus according to according to claim 1,
   wherein the atmospheric pressure detector detects a change in atmospheric pressure at specific time intervals, and the adjuster adjusts the thermal dose supplied to the head by the heater upon the atmospheric pressure detector detects the change in atmospheric pressure.

4. The magnetic disk apparatus according to according to claim 1,
   wherein the atmospheric pressure detector detects a change in atmospheric pressure when the head fails to write or read data, and the adjuster adjusts the thermal dose supplied to the head by the heater after the atmospheric pressure detector detects the change in atmospheric pressure.

5. The magnetic disk apparatus according to claim 1,
   wherein the atmospheric pressure detector reads data written by the head to check for errors, and the adjuster adjusts the thermal dose supplied to the head by the heater according to a result of the check.

6. The magnetic disk apparatus according to claim 1, wherein the atmospheric pressure detector detects a change in atmospheric pressure in powering on the magnetic disk apparatus, and the adjuster adjusts the thermal dose supplied to the head by the heater after the atmospheric pressure detector detects the change in atmospheric pressure.

7. The magnetic disk apparatus according to claim 1, wherein the atmospheric pressure detector detects a change in atmospheric pressure at specific time intervals, and the adjuster adjusts the thermal dose supplied to the head by the heater upon the atmospheric pressure detector detecting the change in atmospheric pressure.

8. The magnetic disk apparatus according to claim 1, wherein the atmospheric pressure detector detects a change in atmospheric pressure when the head fails to write or read data, and the adjuster adjusts the thermal dose supplied to the head by the heater after the atmospheric pressure detector detects the change in atmospheric pressure.

9. The magnetic disk apparatus according to claim 1, wherein the atmospheric pressure detector reads data written by the head to check for errors, and the adjuster adjusts the thermal dose supplied to the head by the heater according to a result of the check.

10. A magnetic disk apparatus, comprising:
- a heater for heating a head incorporated in the magnetic disk apparatus;
- an atmospheric pressure detector for detecting a change in atmospheric pressure in the magnetic disk apparatus; and
- an adjuster for adjusting a thermal dose supplied to the head by the heater according to the change in atmospheric pressure detected by the atmospheric pressure detector,
- wherein the atmospheric pressure detector detects a change in atmospheric pressure according to a tracking accuracy that represents whether the head is positioned above a track to which data are written or from which data are read on a recording medium incorporated in the magnetic disk apparatus.

11. The magnetic disk apparatus according to claim 10, wherein the atmospheric pressure detector detects a change in atmospheric pressure in powering on the magnetic disk apparatus, and the adjuster adjusts the thermal dose supplied to the head by the heater after the atmospheric pressure detector detects the change in atmospheric pressure.

12. The magnetic disk apparatus according to claim 10, wherein the atmospheric pressure detector detects a change in atmospheric pressure at specific time intervals, and the adjuster adjusts the thermal dose supplied to the head by the heater upon the atmospheric pressure detector detecting the change in atmospheric pressure.

13. The magnetic disk apparatus according to claim 10, wherein the atmospheric pressure detector detects a change in atmospheric pressure when the head fails to write or read data, and the adjuster adjusts the thermal dose supplied to the head by the heater after the atmospheric pressure detector detects the change in atmospheric pressure.

14. The magnetic disk apparatus according to claim 10, wherein the atmospheric pressure detector reads data written by the head to check for errors, and the adjuster adjusts the thermal dose supplied to the head by the heater according to a result of the check.

15. A magnetic disk apparatus, comprising:
- a heater for heating a head incorporated in the magnetic disk apparatus;
- an atmospheric pressure detector for detecting a change in atmospheric pressure in the magnetic disk apparatus; and
- an adjuster for adjusting a thermal dose supplied to the head by the heater according to the change in atmospheric pressure detected by the atmospheric pressure detector,
- wherein the atmospheric pressure detector detects a change in atmospheric pressure according to a ratio between a change of a specific frequency element output from the head and the change of the thermal dose.

16. The magnetic disk apparatus according to claim 15, wherein the atmospheric pressure detector detects a change in atmospheric pressure in powering on the magnetic disk apparatus, and the adjuster adjusts the thermal dose supplied to the head by the heater after the atmospheric pressure detector detects the change in atmospheric pressure.

17. The magnetic disk apparatus according to claim 15, wherein the atmospheric pressure detector detects a change in atmospheric pressure at specific time intervals, and the adjuster adjusts the thermal dose supplied to the head by the heater upon the atmospheric pressure detector detecting the change in atmospheric pressure.

18. The magnetic disk apparatus according to claim 15, wherein the atmospheric pressure detector detects a change in atmospheric pressure when the head fails to write or read data, and the adjuster adjusts the thermal dose supplied to the head by the heater after the atmospheric pressure detector detects the change in atmospheric pressure.

19. The magnetic disk apparatus according to claim 15, wherein the atmospheric pressure detector reads data written by the head to check for errors, and the adjuster adjusts the thermal dose supplied to the head by the heater according to a result of the check.

20. A magnetic disk apparatus control method for detecting a change in atmospheric pressure in a magnetic disk apparatus, and for adjusting a thermal dose supplied to a head incorporated in the magnetic disk apparatus by a heater according to the change in atmospheric pressure detected,
- wherein the change in atmospheric pressure is detected according to the ratio between the change of the AGC (automatic gain control) gain corresponding to the output from the head and the change of the thermal dose.

21. A magnetic disk apparatus control method for detecting a change in atmospheric pressure in a magnetic disk apparatus, and for adjusting a thermal dose supplied to a head incorporated in the magnetic disk apparatus by a heater according to the change in atmospheric pressure detected,
- wherein the change in atmospheric pressure is detected according to the tracking accuracy representing whether the head is positioned above a track to which data are written or from which data are read on a recording medium incorporated in the magnetic disk apparatus.

22. A magnetic disk apparatus control method for detecting a change in atmospheric pressure in a magnetic disk apparatus, and for adjusting a thermal dose supplied to a head incorporated in the magnetic disk apparatus by a heater according to the change in atmospheric pressure detected,
- wherein the change on atmospheric pressure is detected according to the ratio between the specific frequency element output from the head and the change of the thermal dose.

\* \* \* \* \*

UNITED STATES PATENT AND TRADEMARK OFFICE
CERTIFICATE OF CORRECTION

PATENT NO. : 7,738,211 B2 Page 1 of 1
APPLICATION NO. : 12/261710
DATED : June 15, 2010
INVENTOR(S) : Kazuhiro Oyamada et al.

It is certified that error appears in the above-identified patent and that said Letters Patent is hereby corrected as shown below:

Column 14, Line 24, change "to according to" to --to--.

Column 14, Line 31, change "to according to" to --to--.

Signed and Sealed this

Second Day of November, 2010

David J. Kappos
*Director of the United States Patent and Trademark Office*